US010761195B2

(12) United States Patent
Donovan

(10) Patent No.: US 10,761,195 B2
(45) Date of Patent: Sep. 1, 2020

(54) MULTI-WAVELENGTH LIDAR SYSTEM

(71) Applicant: OPSYS Tech Ltd., Holon (IL)

(72) Inventor: Mark J. Donovan, Mountain View, CA (US)

(73) Assignee: OPSYS Tech Ltd., Holon (IL)

(*) Notice: Subject to any disclaimer, the term of this patent is extended or adjusted under 35 U.S.C. 154(b) by 385 days.

(21) Appl. No.: 15/456,789

(22) Filed: Mar. 13, 2017

(65) Prior Publication Data
US 2017/0307736 A1 Oct. 26, 2017

Related U.S. Application Data

(60) Provisional application No. 62/396,295, filed on Sep. 19, 2016, provisional application No. 62/326,576, filed on Apr. 22, 2016.

(51) Int. Cl.
*G01S 7/484* (2006.01)
*G01S 7/497* (2006.01)
(Continued)

(52) U.S. Cl.
CPC ............ *G01S 7/484* (2013.01); *G01S 7/4815* (2013.01); *G01S 7/497* (2013.01); *G01S 7/499* (2013.01);
(Continued)

(58) Field of Classification Search
CPC ...... G01S 7/4811; G01S 7/4815; G01S 17/87; G01S 17/936; G01S 17/10; G01S 17/42
See application file for complete search history.

(56) References Cited

U.S. PATENT DOCUMENTS 5,157,257 A * 10/1992 Geiger ............... G01N 21/3504
250/338.5
5,552,893 A 9/1996 Akasu
(Continued)

FOREIGN PATENT DOCUMENTS

EP 1569007 A2 8/2005
EP 2656099 A1 12/2011
(Continued)

OTHER PUBLICATIONS

"Notification of Transmittal of the International Search Report and the Written Opinion of the International Searching Authority, or the Declaration" for International Patent Application No. PCT/US2018/041021, dated Nov. 5, 2018, 15 Pages, Korean Intellectual Property Office, Daejeon, Republic of Korea.
(Continued)

*Primary Examiner* — Luke D Ratcliffe
(74) *Attorney, Agent, or Firm* — Rauschenbach Patent Law Group, PLLC; Kurt Rauschenbach

(57) ABSTRACT

A multi-wavelength LIDAR system includes a first laser source that generates a first optical beam having a first wavelength and a second laser source that generates a second optical beam having a second wavelength. An optical element projects the first optical beam to form a first beam profile at a target plane and projects the second optical beam to form a second beam profile at the target plane. An optical receiver generates a first wavelength signal corresponding to the received reflected portion of the first beam profile and generates a second wavelength signal corresponding to the reflected portion of the second beam profile at the target plane. A controller generates a measurement point cloud from the first and second wavelength signals, wherein an angular resolution of the measurement point cloud depends
(Continued)

on a relative position of the first and second beam profiles at the target plane.

25 Claims, 27 Drawing Sheets

(51) Int. Cl.
    *G01S 17/89*         (2020.01)
    *G01S 7/481*         (2006.01)
    *G01S 17/931*       (2020.01)
    *G01S 7/499*         (2006.01)
    *G01S 17/10*         (2020.01)

(52) U.S. Cl.
    CPC .............. *G01S 17/10* (2013.01); *G01S 17/89* (2013.01); *G01S 17/931* (2020.01)

(56) References Cited

U.S. PATENT DOCUMENTS

| | | |
|---|---|---|
| 5,909,296 A | 6/1999 | Tsacoyeanes |
| 6,353,502 B1 | 3/2002 | Marchant et al. |
| 6,680,788 B1 | 1/2004 | Roberson et al. |
| 6,775,480 B1 | 8/2004 | Goodwill |
| 6,788,715 B1 | 9/2004 | Leeuwen et al. |
| 6,829,439 B1 | 12/2004 | Sidorovich et al. |
| 6,888,871 B1 | 5/2005 | Zhang et al. |
| 7,065,112 B2 | 6/2006 | Ghosh et al. |
| 7,110,183 B2 | 9/2006 | von Freyhold et al. |
| 7,544,945 B2 | 6/2009 | Tan et al. |
| 7,652,752 B2 | 1/2010 | Fetzer et al. |
| 7,969,558 B2 | 6/2011 | Hall |
| 8,115,909 B2 | 2/2012 | Behringer et al. |
| 8,247,252 B2 | 8/2012 | Gauggel et al. |
| 8,301,027 B2 | 10/2012 | Shaw et al. |
| 8,576,885 B2 | 11/2013 | van Leeuwen et al. |
| 8,675,181 B2 | 3/2014 | Hall |
| 8,675,706 B2 | 3/2014 | Seurin et al. |
| 8,783,893 B1 | 7/2014 | Seurin et al. |
| 8,824,519 B1 | 9/2014 | Seurin et al. |
| 9,038,883 B2 | 5/2015 | Wang et al. |
| 9,048,633 B2 | 6/2015 | Gronenborn et al. |
| 9,268,012 B2 | 2/2016 | Ghosh et al. |
| 9,285,477 B1 | 3/2016 | Smith et al. |
| 9,360,554 B2 | 6/2016 | Retterath et al. |
| 9,392,259 B2 | 7/2016 | Borowski |
| 9,516,244 B2 | 12/2016 | Borowski |
| 9,520,696 B2 | 12/2016 | Wang et al. |
| 9,553,423 B2 | 1/2017 | Chen et al. |
| 9,560,339 B2 | 1/2017 | Borowski |
| 9,574,541 B2 | 2/2017 | Ghosh et al. |
| 9,658,322 B2 | 5/2017 | Lewis |
| 9,841,495 B2 | 12/2017 | Campbell et al. |
| 9,933,513 B2 | 4/2018 | Dussan et al. |
| 9,946,089 B2 | 4/2018 | Chen et al. |
| 9,989,406 B2 | 6/2018 | Pacala et al. |
| 9,989,629 B1 | 6/2018 | LaChapelle |
| 9,992,477 B2 | 6/2018 | Pacala et al. |
| 10,063,849 B2 | 8/2018 | Pacala et al. |
| 2003/0043363 A1 | 3/2003 | Jamieson et al. |
| 2003/0147652 A1 | 8/2003 | Green et al. |
| 2004/0228375 A1 | 11/2004 | Ghosh et al. |
| 2005/0025211 A1 | 2/2005 | Zhang et al. |
| 2005/0232628 A1 | 10/2005 | von Freyhold et al. |
| 2006/0231771 A1 | 10/2006 | Lee et al. |
| 2007/0024849 A1* | 2/2007 | Carrig ................... G01N 21/21 356/337 |
| 2007/0071056 A1 | 3/2007 | Chen |
| 2007/0177841 A1 | 8/2007 | Dazinger |
| 2007/0181810 A1* | 8/2007 | Tan ....................... G01S 7/4811 250/341.1 |
| 2008/0074640 A1 | 3/2008 | Walsh et al. |
| 2010/0215066 A1 | 8/2010 | Mordaunt et al. |
| 2010/0271614 A1 | 10/2010 | Alburquerque et al. |
| 2010/0302528 A1 | 12/2010 | Hall |
| 2011/0176567 A1 | 7/2011 | Joseph |
| 2013/0163626 A1 | 6/2013 | Seurin et al. |
| 2013/0163627 A1 | 6/2013 | Seurin et al. |
| 2013/0208256 A1 | 8/2013 | Mamidipudi et al. |
| 2013/0208753 A1 | 8/2013 | van Leeuwen et al. |
| 2014/0043309 A1 | 2/2014 | Go et al. |
| 2014/0139467 A1 | 5/2014 | Ghosh et al. |
| 2014/0218898 A1 | 8/2014 | Seurin et al. |
| 2014/0247841 A1 | 9/2014 | Seurin et al. |
| 2014/0333995 A1 | 11/2014 | Seurin et al. |
| 2015/0055117 A1 | 2/2015 | Pennecot et al. |
| 2015/0069113 A1 | 3/2015 | Wang et al. |
| 2015/0109603 A1* | 4/2015 | Kim ........................ G01S 17/10 356/4.07 |
| 2015/0131080 A1 | 5/2015 | Retterath et al. |
| 2015/0219764 A1 | 8/2015 | Lipson |
| 2015/0255955 A1 | 9/2015 | Wang et al. |
| 2015/0260830 A1 | 9/2015 | Ghosh et al. |
| 2015/0311673 A1 | 10/2015 | Wang et al. |
| 2015/0340841 A1 | 11/2015 | Joseph |
| 2015/0362585 A1 | 12/2015 | Ghosh et al. |
| 2015/0377696 A1 | 12/2015 | Shpunt et al. |
| 2015/0378023 A1 | 12/2015 | Royo Royo et al. |
| 2016/0072258 A1 | 3/2016 | Seurin et al. |
| 2016/0080077 A1 | 3/2016 | Joseph et al. |
| 2016/0161600 A1 | 6/2016 | Eldada et al. |
| 2016/0254638 A1 | 9/2016 | Chen et al. |
| 2016/0266242 A1 | 9/2016 | Gilliland et al. |
| 2016/0282468 A1* | 9/2016 | Gruver ................. H05K 999/99 |
| 2016/0348636 A1 | 12/2016 | Ghosh et al. |
| 2017/0003392 A1 | 1/2017 | Bartlett et al. |
| 2017/0059838 A1 | 3/2017 | Tilleman |
| 2017/0115497 A1 | 4/2017 | Chen et al. |
| 2017/0153319 A1 | 6/2017 | Villeneuve et al. |
| 2017/0168162 A1 | 6/2017 | Jungwirth |
| 2017/0181810 A1 | 6/2017 | Tennican |
| 2017/0219426 A1 | 8/2017 | Pacala et al. |
| 2017/0256915 A1 | 9/2017 | Ghosh et al. |
| 2017/0285169 A1 | 10/2017 | Holz |
| 2017/0289524 A1 | 10/2017 | Pacala et al. |
| 2017/0307736 A1 | 10/2017 | Donovan |
| 2017/0307758 A1 | 10/2017 | Pei et al. |
| 2017/0353004 A1 | 12/2017 | Chen et al. |
| 2018/0074198 A1 | 3/2018 | Von Novak et al. |
| 2018/0152691 A1 | 5/2018 | Pacala et al. |
| 2018/0167602 A1 | 6/2018 | Pacala et al. |
| 2018/0180720 A1 | 6/2018 | Pei et al. |
| 2018/0180722 A1 | 6/2018 | Pei et al. |
| 2018/0203247 A1 | 7/2018 | Chen et al. |
| 2018/0209841 A1 | 7/2018 | Pacala et al. |
| 2019/0170855 A1 | 6/2019 | Keller et al. |

FOREIGN PATENT DOCUMENTS

| | | |
|---|---|---|
| EP | 2656106 A1 | 12/2011 |
| EP | 3497477 A1 | 8/2016 |
| EP | 2656100 A1 | 10/2016 |
| EP | 3526625 A1 | 11/2016 |
| JP | 2003258359 A | 9/2003 |
| JP | 4108478 B2 | 6/2008 |
| WO | 99-42856 A1 | 8/1999 |
| WO | 2013107709 A1 | 7/2013 |
| WO | 2018028795 A1 | 2/2018 |
| WO | 2018082762 A1 | 5/2018 |

OTHER PUBLICATIONS

"Notification of Transmittal of the International Search Report and the Written Opinion of the International Searching Authority, or the Declaration" for International Patent Application No. PCT/US2018/021553, dated Jun. 20, 2018, 13 pages, International Searching Authority, Korean Intellectual Property Office, Daejeon, Republic of Korea.
U.S. Appl. No. 15/915,840, filed Mar. 8, 2018 in the USPTO.
U.S. Appl. No. 16/028,774, filed Jul. 6, 2018 in the USPTO.

(56) References Cited

OTHER PUBLICATIONS

Notification of Transmittal of the International Search Report and the Written Opinion of the International Searching Authority, or the Declaration for International Patent Application No. PCT/US2019/024343, dated Jul. 12, 2019, 17 Pages, ISA/KR, Korean Intellectual Property Office, Daejeon, Republic of Korea.

"Notification Concerning Transmittal of International Preliminary Report on Patentability (Chapter 1 of the Patent Cooperation Treaty)" for International Patent Application No. PCT/US2017/026109, dated Nov. 1, 2018, 13 Pages, The International Bureau of WIPO, Geneva, Switzerland.

Notification of Transmittal of the International Search Report and the Written Opinion of the International Searching Authority, or the Declaration, for International Application No. PCT/US2017/026109, dated Jun. 19, 2017, 17 pages, International Search Authority/Korean Intellectual Property Office, Daejeon, Republic of Korea.

"Supplementary European Search Report" for European Patent Application No. EP17786325, dated Mar. 11, 2020, 22 pages, European Patent Office, Munich, Germany.

"Notification Concerning Transmittal of International Preliminary Report on Patentability (Chapter I of the Patent Cooperation Treaty)" for International Patent Application No. PCT/US2018/021553, dated Sep. 26, 2019, 9 pages, The International Bureau of WIPO, Geneva, Switzerland.

"Notification of Transmittal of the International Search Report and the Written Opinion of the International Searching Authority, or the Declaration" for International Patent Application No. PCT/US2019/043674, dated Nov. 15, 2019, 16 pages, International Searching Authority/KR, Daejeon, Republic of Korea.

"European Search Report" for European Patent Application No. 17786325.5, dated Nov. 9, 2019, 18 pages, European Patent Office, Munich, Germany.

Notification Concerning Transmittal of International Preliminary Report on Patentability (Chapter I of the Patent Cooperation Treaty) for International Application No. PCT/US18/041021, dated Feb. 6, 2020, 10 pages, The International Bureau of WIPO, Geneva, Switzerland.

"Notification of Transmittal of the International Search Report and the Written Opinion of the International Searching Authority, or the Declaration" for International Patent Application No. PCT/US2018/057026, dated Dec. 16, 2019, 11 pages, International Searching Authority, Korean Intellectual Property Office, Daejeon, Republic of Korea.

\* cited by examiner

400

| | Horizontal Angular Resolution |
|---|---|
| Distance | Step Size of 0.175 meter |
| 40 m | 0.25 degree |
| 70 m | 0.143 degree |
| 100 m | 0.1 degree |

FIG. 4

|  | 16-Laser | 32-Laser |
|---|---|---|
| Vertical FOV | +15 to -15 (30 degrees) | +10.67 to -30.67 (40 degrees) |
| Vertical Angular Resolution | 1.875 degree | 1.25 degree |
| Single Pulse Repetition Rate | 2.44 usec | 1.44 usec |
| Full Vertical Sequence Rate (per spec) | 55.296 usec | 46.1 usec |
| Equivalent Sample Rate | 289,351 Hz (~300 kHz) | 694,143 Hz (~700 kHz) |
| Nominal Rotation Rate | 600 rpm (10 Hz) | 600 rpm (10 Hz) |
| Nominal Horizontal Angular Resolution | 0.199 degree | 0.166 degree |

PRIOR ART

| Parameter | Specification |
|---|---|
| Distance Range | Up to 100m |
| FOV (V/H) | 22.5° / min 22.5° |
| Angular Resolution (V/H) | 0.7° / 0.18° |
| Wavelength Range | 808 nm to 1064 nm |
| Eye Safety | Class 1 |

FIG. 6

2 WAVELENGTH

3 WAVELENGTH

MULTI-WAVELENGTH LIDAR SYSTEM

CROSS REFERENCE TO RELATED APPLICATIONS

The present application is a non-provisional application of U.S. Provisional Patent Application No. 62/326,576, entitled "Multi-Wavelength Lidar System" filed on Apr. 22, 2016 and U.S. Provisional Patent Application No. 62/396,295, entitled "WDM Lidar System" filed on Sep. 19, 2016. The entire contents of U.S. Provisional Patent Application No. 62/326,576 and U.S. Provisional Patent Application No. 62/396,295 are herein incorporated by reference.

The section headings used herein are for organizational purposes only and should not to be construed as limiting the subject matter described in the present application in any way.

INTRODUCTION

Autonomous (self-driving) and semi-autonomous automobiles use a combination of different sensors and technologies such as radar, image-recognition cameras, and sonar for detection and location of surrounding objects. These sensors enable a host of improvements in driver safety including collision warning, automatic-emergency braking, lane-departure warning, lane-keeping assistance, adaptive cruise control, and piloted driving. Among these sensor technologies, light detection and ranging (LIDAR) systems are one of the most critical enabling real-time measurements of object distances.

BRIEF DESCRIPTION OF THE DRAWINGS

The present teaching, in accordance with preferred and exemplary embodiments, together with further advantages thereof, is more particularly described in the following detailed description, taken in conjunction with the accompanying drawings. The skilled person in the art will understand that the drawings, described below, are for illustration purposes only. The drawings are not necessarily to scale, emphasis instead generally being placed upon illustrating principles of the teaching. The drawings are not intended to limit the scope of the Applicant's teaching in any way.

FIG. 4 illustrates a table presenting the horizontal angular resolution as a function of distance for an embodiment of a LIDAR sensor system of the present teaching.

FIG. 5 illustrates a table presenting the advertised performance of Velodyne LiDAR™ systems.

FIG. 6 illustrates a table presenting the performance specifications of an embodiment of a LIDAR system of the present teaching.

DESCRIPTION OF VARIOUS EMBODIMENTS

The present teaching will now be described in more detail with reference to exemplary embodiments thereof as shown in the accompanying drawings. While the present teachings are described in conjunction with various embodiments and examples, it is not intended that the present teachings be limited to such embodiments. On the contrary, the present teachings encompass various alternatives, modifications and equivalents, as will be appreciated by those of skill in the art. Those of ordinary skill in the art having access to the teaching herein will recognize additional implementations, modifications, and embodiments, as well as other fields of use, which are within the scope of the present disclosure as described herein.

Reference in the specification to "one embodiment" or "an embodiment" means that a particular feature, structure, or characteristic described in connection with the embodiment is included in at least one embodiment of the teaching. The appearances of the phrase "in one embodiment" in various places in the specification are not necessarily all referring to the same embodiment.

It should be understood that the individual steps of the methods of the present teachings can be performed in any order and/or simultaneously as long as the teaching remains operable. Furthermore, it should be understood that the apparatus and methods of the present teachings can include any number or all of the described embodiments as long as the teaching remains operable.

The present teaching relates to Light Detection and Ranging Systems (LIDAR) that measure distances to various objects or targets that reflect and/or scatter light. In particular, the present teaching relates to LIDAR systems that advantageously use multiple wavelengths of light to improve performance and that may also reduce size, cost, and complexity compared to prior art LIDAR systems.

Systems of the present teaching may use light sources that include single emitters and/or multiple emitters. For example, light sources that use a single element VCSEL or a single edge-emitting laser device would be considered single emitters. Light sources that use multiple VCSEL elements or multiple edge-emitting laser sources arranged on one or more substrates are considered multiple emitter sources. The multi-element emitters may be configured in various array configurations, including one-dimensional and two-dimensional arrays. The descriptions below refer to various embodiments with single-emitter sources and/or multi-emitter laser sources. However, it will be apparent to those familiar with the art that the features of particular embodiments of LIDAR systems of the present teaching should not be considered limited to either single-emitter and/or multi-emitter laser sources, but rather should be more broadly construed to apply to both single-emitter and/or multi-emitter laser sources as consistent with the present teaching.

Figure 1:
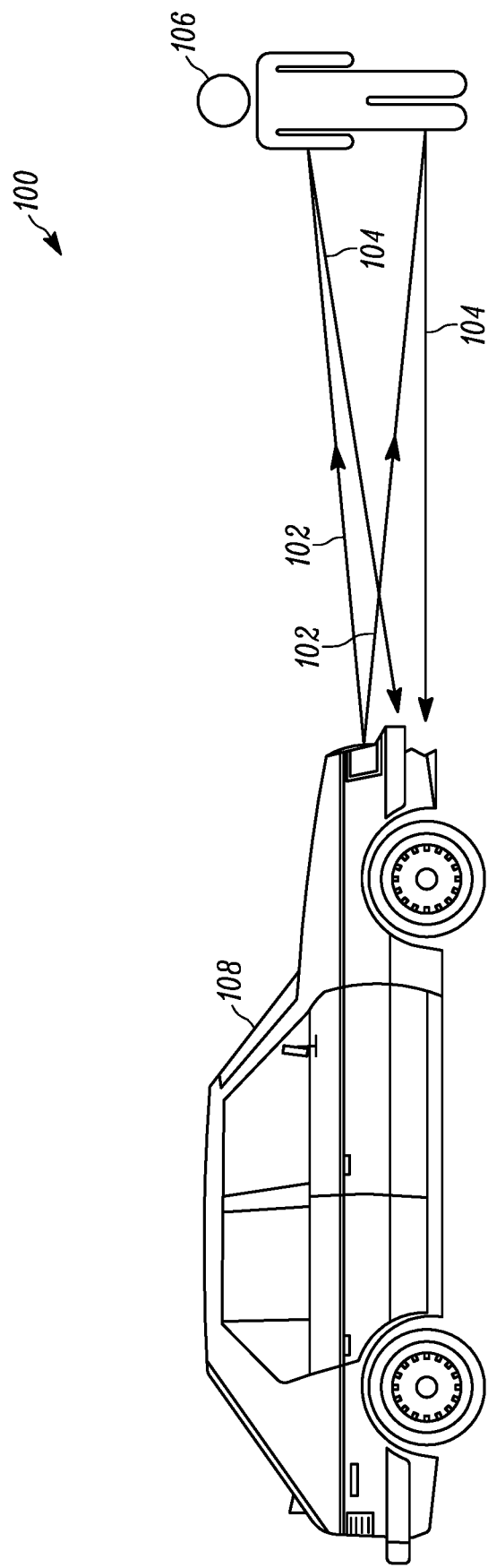
FIG. 1 illustrates the operation of a LIDAR system of the present teaching implemented in a vehicle.

FIG. 1 illustrates the operation of a LIDAR system 100 of the present teaching implemented in a vehicle. The LIDAR system 100 includes a laser projector, also referred to as an illuminator, that projects light beams 102 generated by a light source toward a target scene and a receiver that receives the light 104 that reflects of an object, shown as a person 106, in that target scene. LIDAR systems typically also include a controller that computes the distance information about the object 106 from the reflected light, and an element that can scan or provide a particular pattern of the light that may be a static pattern across a desired range and field-of-view (FOV). The receiver and controller are used to convert the received signal light into measurements that represent a pointwise 3D map of the surrounding environment that falls within the LIDAR system range and FOV. In various embodiments, the controller can be a simple electrical circuit or a more complicated processor, depending on the particular application.

The laser source and optical beam projection means that form the illuminator and the receiver may be located on the front side of a vehicle 108. A person 106, and/or another object, such as a car or light pole, will provide light reflected from the source back to the receiver, and a range, or distance, to that object is determined. As is known in the art, a LIDAR receiver calculates range information based on time-of-flight measurements of light pulses emitted from the light source. In addition, known information about the optical beam profile that illuminates the scene in a target plane associated with a particular range and based on the particular design of the source and projector system is used to determine location information about the reflecting surface, thereby generating a complete x,y,z, or three-dimensional picture of the scene. In other words, the pointwise 3D map of the surrounding environment represents a collection of measurement data that indicates position information from all the surfaces that reflect the illumination from the source to the receiver within the field-of-view of the LIDAR system. In this way, a 3D representation of objects in the field-of-view of the LIDAR system is obtained. The pointwise 3D data map may also be referred to as a measurement point cloud.

Figure 2:
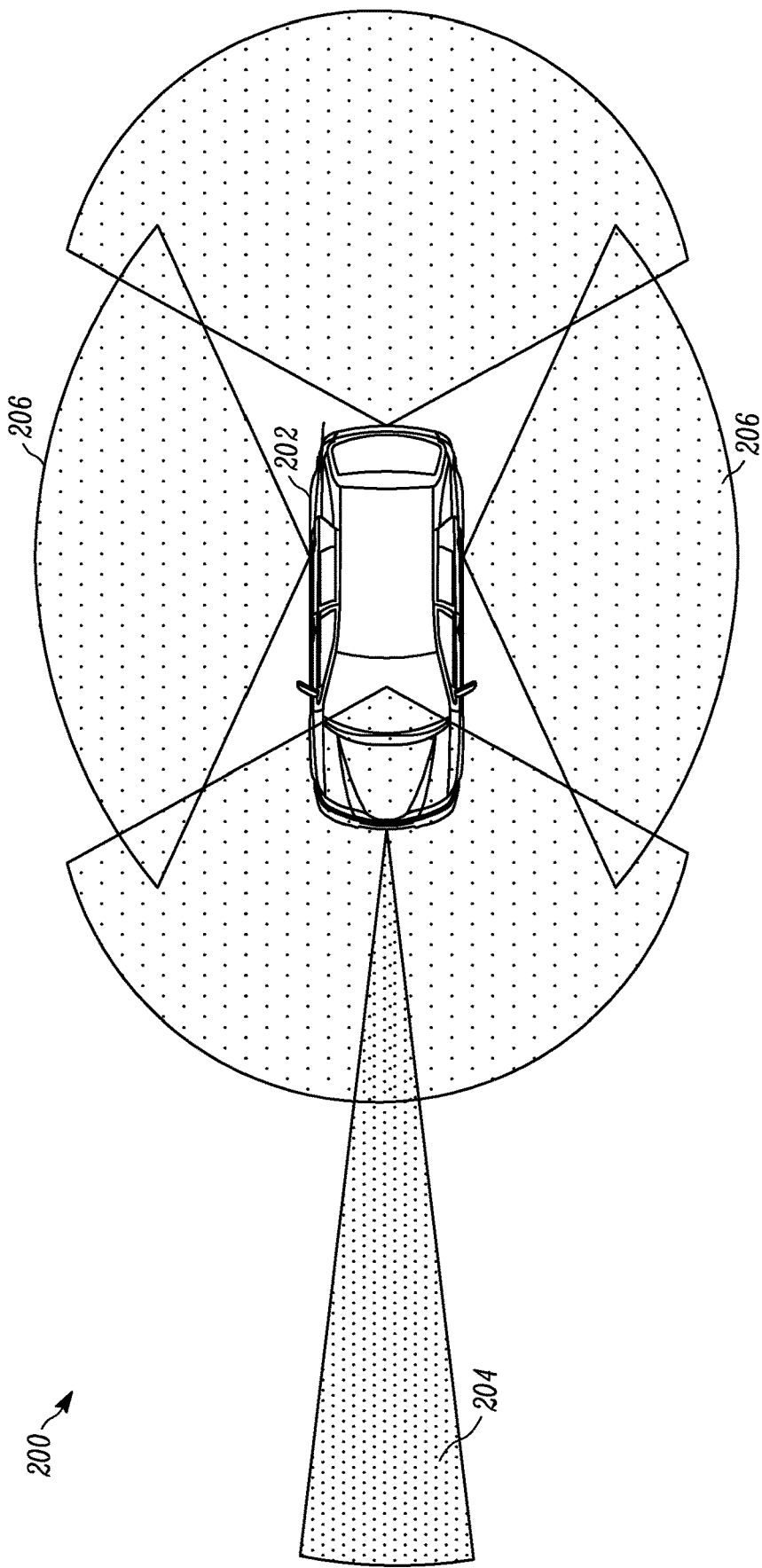
FIG. 2 illustrates a schematic diagram representing two-dimensional field-of-view and range requirements of a typical LIDAR sensing system for the surroundings of an automobile.

FIG. 2 illustrates a schematic diagram representing two-dimensional field-of-view and range requirements of a typical surroundings sensing LIDAR system 200 for an automobile 202. For example, an adaptive cruise control function may require a field-of-view and range 204 with a narrow field-of-view, but a longer-distance range requirement, compared to the side looking "surround view" field-of-view and range 206. In general, sensor functions on an automobile may be enabled by a combination of LIDAR, radar, cameras, and ultrasonic sensors. The combining of these sensor data generate information about the surrounding environment is often referred to as "sensor fusion".

Although the present teaching describes LIDAR systems in the context of automotive vehicles, where LIDAR is widely used for autonomous, or self-driving, or driver-assisted, vehicles, it should be understood that the embodiments may be applicable to any vehicle. Other types of vehicles might include robots, tractors, trucks, airplanes, drones, boats, ships, and others. The present teachings are also applicable to various stationary applications. For example, in high density, metropolitan areas, LIDAR could be employed to monitor traffic, both vehicular and pedestrian. We can expect to see LIDAR deployed in many different applications as the cost of the LIDAR systems come down over time.

Figure 3:
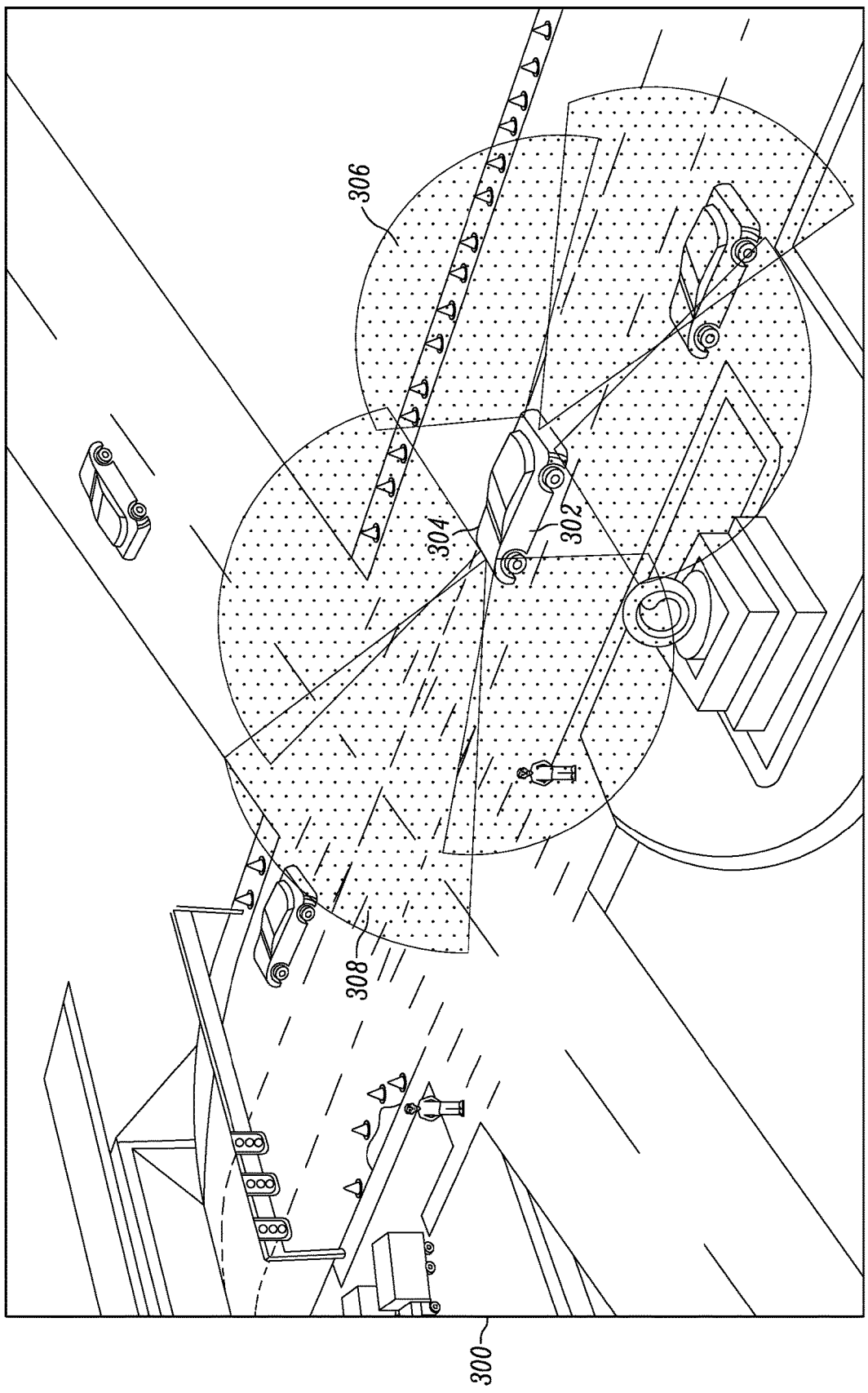
FIG. 3 illustrates an embodiment of a multi-module LIDAR sensor system of the present teaching.

FIG. 3 illustrates a sensor system 300 for an automobile 302 of the present teaching. There are six separate LIDAR modules 304 that operate with various ranges and FOVs, illustrated by the 2D wedges in the diagram. Four of the LIDAR modules 304 are predominantly side-view, and each have a range and FOV 306 of approximately 120 degrees. The forward module is shown with a range and FOV 308 that has the narrowest FOV and longest distance range.

Some prior art LIDAR system designs for automobile sensing disclose that a LIDAR system should be able to resolve a pedestrian walking in front of the car at a distance of 30 m in order to provide adequate time to avoid a collision. The pedestrian cross section would roughly be 280 mm, so the angular resolution required for the LIDAR system needs to be approximately 0.5 degrees. See, for example, U.S. Pat. No. 7,544,945 entitled "Vertical Cavity Surface Emitting Laser (VCSEL) Array Laser Scanner."

However, one feature of the present teaching is the recognition that automotive applications can demand a much higher angular resolution, which in some application is much less than 0.5 degree. Higher angular resolution can enable some form of image identification. For example, a higher resolution would allow the sensor system to be able to distinguish between a pedestrian and a light pole, or between two motorcycles and a car. As such, a target specification of 0.1-degree angular resolution at 100-m range may be required. The angular resolution could be less for shorter distances.

FIG. 4 illustrates a table 400 providing the horizontal angular resolution as a function of distance for one embodiment of a LIDAR sensor system of the present teaching. The data presented in the table 400 assumes the physical distance measured is the important parameter.

Future vehicles will adopt multiple low-cost LIDAR sensors in order to cover the complete 360-degree FOV. It also appears there may be a different LIDAR requirement of distance for side-view and blind spot compared with the LIDAR requirement of distance for looking directly in front of the vehicle. For a solid-state LIDAR system that does not rotate, it's understood that the FOV must be less than 180 degrees. Prior art LIDAR systems manufactured by Innoviz Technologies, for example, advertise a 100 degree horizontal (H)×25 degree vertical (V) FOV combined with a 0.1 degree angular resolution. Prior art LIDAR systems manufactured by Quanergy Systems advertise a 120 degree horizontal FOV with angular resolution of less than 0.1 degree. Quanergy Systems' LIDAR uses an optical phased array as a transmitter, which can steer pulses of light by shifting the phase of a laser pulse as it's projected through the array. One disadvantage of using phased arrays is the presence of side lobes that can impact the illumination pattern at the target. The solid-state laser source LIDAR systems of the present teaching do not produce side lobes associated with phased array approaches. Another limitation of prior art systems using a single-wavelength of light, is the speed of light. Travel time for 200 meters is 0.67 microseconds, limiting a LIDAR system to fire the laser about every microsecond or so, depending on overhead. The laser pulse rate is typically not higher than this one MHz rate, within the FOV of the detector, so that the system is capable of identifying the return pulse for each measurement point without ambiguity.

Some LIDAR systems utilize multiple lasers in the illuminator to help improve system performance, such as angular resolution, refresh rate, and FOV. However, prior art multi-laser-source compact LIDAR systems, such as those manufactured by Velodyne LiDAR™ systems, cannot achieve an arbitrarily fine angular resolution, a wide FOV, and a high refresh rate with a single unit using thirty-two lasers.

FIG. 5 illustrates a table 500 presenting the advertised performance of a LiDAR™ system commercially available from Velodyne. These Velodyne systems rotate, and so have a horizontal field-of-view of 360-degree. In the vertical direction, the 32-lasers are arranged to provide an advertised 40-degree field-of-view, with a uniform angular resolution of 1.25 degree. It should be clear that with a rotating system, the full field-of-view can only be refreshed at the rate of rotation. As well, all 32-lasers are arranged in a single vertical line, such that the system essentially is pointing in a single horizontal direction when not rotating. Such a system typically is operated with a rotation rate of 10 Hz, to provide an angular resolution of ~0.16 degrees. Slower rotation speeds can be used to achieve a finer angular resolution, but at the expense of refresh rate. If an object moves significantly in the time it takes the rotating system to complete one revolution, the vehicle may not be able to respond quick enough to avoid or steer appropriately around the object. A system that can look in any direction, and at any time, is desirable in order to be able to refresh the field-of-view at a higher rate. In practice, multiple rotating LIDAR systems have been used on a single automobile, as many as four LIDAR systems in some instances, to be able to provide a full 360 degree surround view with adequate refresh rate and fine angular resolution.

One feature of the multi-wavelength LIDAR system of the present teaching is providing a relatively high refresh rate. The refresh rate is also known as the frame rate. Some embodiments of the present teaching provide a system refresh rate that is at least the same as the typical low-cost CMOS camera system refresh rate of 30-Hz, and potentially as high as 1 kHz. To understand why a high refresh rate is important, consider an automobile traveling at 100 km/h. Under these conditions, the automobile will move about 3 meters in 0.1 seconds. So, if the refresh rate is only 10 Hz, objects in front of the car will move significantly in that time causing a significant loss of resolution. For a LIDAR system of the present teaching, utilizing four wavelengths, with 4,096 lasers being measured in one frame, and a pulse duration of 1 microsecond, the refresh rate is 1 kHz for a single system. If multiple systems are used to cover the complete 360-degree field-of-view, then the refresh rate would still be 1 kHz. This assumes a single pulse per measurement. If we need multiple pulses per measurement, the refresh rate will be lower.

FIG. 6 illustrates a table 600 providing the specifications associated with various parameters of LIDAR systems of the present teaching. The system specification in the table 600 assumes a solid-state system that utilizes a multi-emitter 2D VCSEL array source. To achieve this specification, 4,096 individual lasers are required. This can be achieved, for example, by using an array of 32 lasers in the vertical direction and 128 lasers in the horizontal direction. In a four wavelength system, a 32×32 array is needed for each wavelength. In embodiments in which the lasers are on a 250 micron pitch, an array of 32×32 lasers would have an 8 mm×8 mm foot print. In other configurations for lower cost, smaller arrays can be used. In these configurations, the system can use fewer lasers to achieve arrays with a 4×4 mm foot print. The system specifications will improve with additional lasers. In the future, we expect we can obtain lasers on a 125-micron pitch allowing 32×32 arrays in a 4×4 mm foot print.

It is desirable to realize module sizes for the LIDAR system of the present teaching that are less than 125 cm$^3$, and/or modules with less than 2.5-inch dimension on a side. In some embodiments, the modules include the illuminator and the receiver in the same module. In some embodiments, there is a separate module for the illuminator and the receiver.

Figure 7:
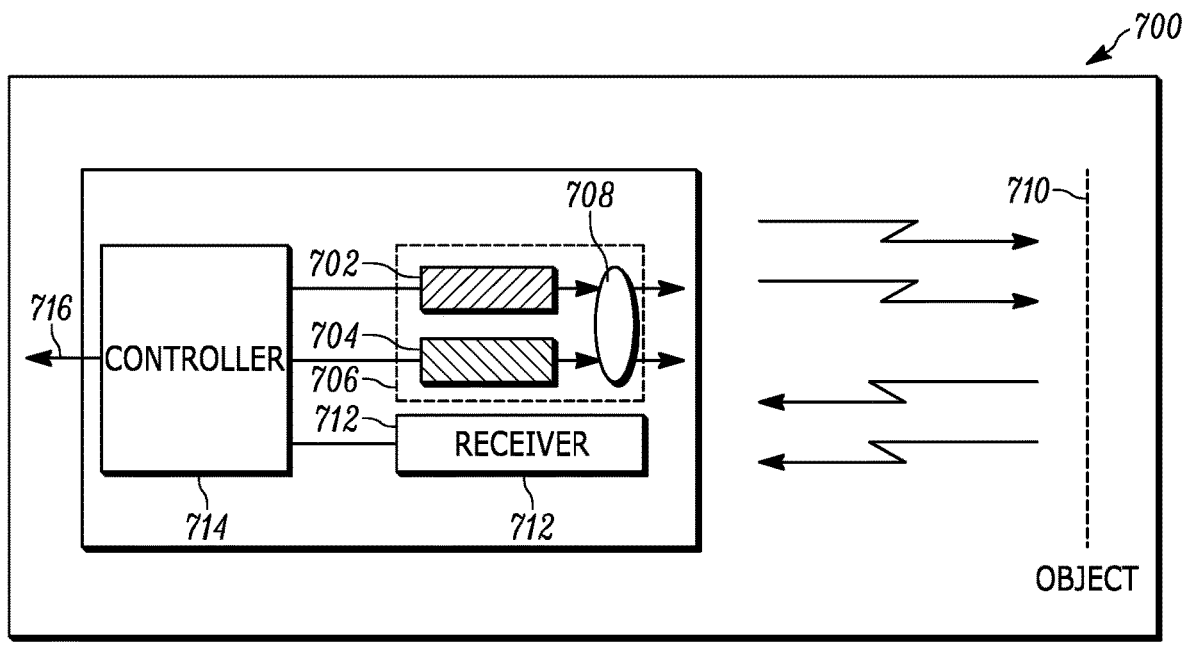
FIG. 7 illustrates an embodiment of a multi-wavelength LIDAR system using two lasers of the present teaching.

One feature of the present teaching is the illuminator includes lasers that emit optical beams with individual, distinct wavelengths. FIG. 7 illustrates an embodiment of a multi-wavelength LIDAR system 700 using two lasers according to the present teaching. The first laser 702 operates at a first wavelength, and the second laser 704 operates at a second wavelength. The lasers may include integrated or separate collimation optics (not shown) that form part of an optical projection element that is used to form a beam profile at various target planes across the FOV and range of the LIDAR system. The illuminator 706 can also include an optical device 708 that further shapes and projects the optical beams to form particular beam profiles a target plane 710. In various embodiments, various types of optical devices can be used to form the projection element including, for example, one or more of lenses, diffractive optics, prisms, thin-film wavelength sensitive devices, and partially reflecting mirrors.

A receiver 712 receives light reflected off the surface of objects at various target planes 710 in the FOV and range of the LIDAR system. The receiver 712 can distinguish light from the two wavelengths emitted by the sources 702, 704. As such, reflected illumination from each wavelength is processed separately. A controller 714 is used to process the received light. The controller 714 provides LIDAR data at an output 716. The complexity of the controller 714 depends on the particular embodiment of the LIDAR system. The controller 714 may be used to control the laser sources 702, 704. In various embodiments, the controller 714 may comprise any or all of electrical circuits, electronic chips, microprocessors or computers. It is straightforward to add N wavelengths of lasers to the embodiment shown in FIG. 7. In some embodiments, there are additional optical elements that collimate the light and provide the desired FOV.

A projection element is described herein as an element that collimates or otherwise shapes and project a laser beam or multiple laser beams in a particular direction. A projection element may comprise one or more optical devices positioned in the path of the optical beams. These devices and their positions, together with the initial shape and paths of the beam or beams emitted from the laser source, produce the desired beam profile, which is a combination of beam shape and/or beam position at a particular point in space.

Figure 8:
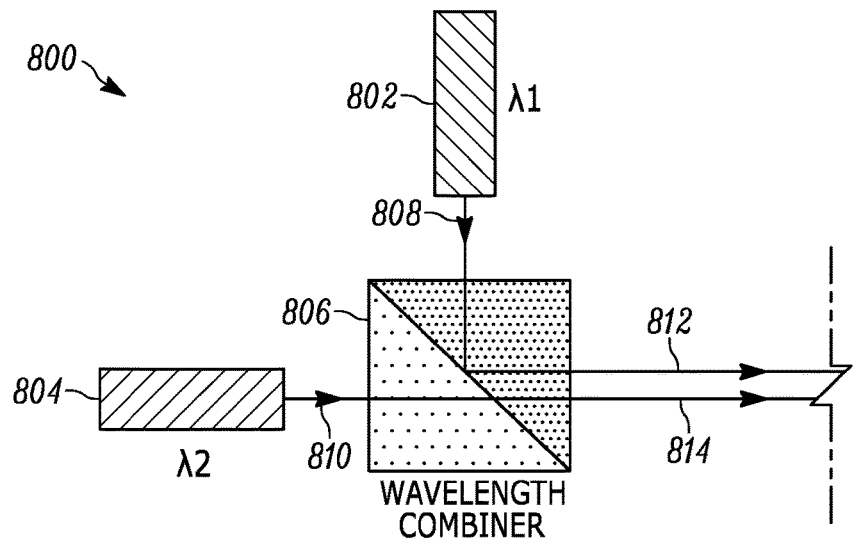
FIG. 8 illustrates an embodiment of an illuminator for a multi-wavelength LIDAR system using two lasers and a wavelength combiner of the present teaching.

In some embodiments, additional optical devices are used to project the optical beams from the laser sources. FIG. 8 illustrates an embodiment of an illuminator 800 for a multi-wavelength LIDAR system using two single-emitter lasers 802, 804 and a wavelength combiner 806 of the present teaching. Two laser sources 802, 804 with different wavelengths generate two optical beams 808, 810 on two paths. A wavelength combiner 806 is used to combine the beams onto two parallel paths 812, 814. In some embodiments, the parallel paths are offset, as illustrated in FIG. 8. In some embodiments, the parallel paths completely overlap. In some embodiments, the paths after the wavelength combiner 806 are not necessarily parallel, but are arranged to produce a desired beam profile at target planes in the FOV and range of the LIDAR system. The use of a wavelength combiner 806 allows additional flexibility in both the physical layout of the system and the associated beam profiles that are generated by the LIDAR.

One feature of the present teaching is the ability to use different wavelengths to produce different LIDAR FOV, range, and/or resolution in a compact system. The light beams at the two or more wavelengths may be able to share at least some of the same optical devices that form the projection element, and yet still realize different beam profiles that result in a measurement point cloud that represents different range and/or FOV and/or resolution at each wavelength. For example, one problem with prior art LIDAR systems that use a signal wavelength is that the launch power required to reach 100-meter range is so high that for close proximity reflections (e.g. a few meters) the receiver saturates. This means these prior art LIDAR systems are blind to near objects. This problem can be solved with a two-wavelength system, where the first wavelength is used for a 100-meter range, but the second wavelength has a low power only meant for near-proximity measurements. Using the two-wavelengths, the measurements can be simultaneous because of the parallel operation capability. The extension to more than two wavelengths is straightforward.

Another feature of the present teaching is that lasers with additional wavelengths can be added to perform other functions than LIDAR ranging. For example, additional lasers can be added to provide measurements of the orientation of optical devices within the LIDAR system. The light from these sources at additional wavelength may serve a sole purpose to provide angular measurement of the elements that project the optical beams and/or replicate or scan the optical beams. In some embodiments, MEMs devices are used to project beams, and it can be important to have direct feedback of the mirror position. Another laser combined with appropriate receiver measurement system could provide direct angle measurement of mirror position. A natural extension of the above embodiments would be to use a plurality of lasers of the same wavelength in each case, that is, either a 1D or 2D array of lasers of each wavelength instead of a single laser of each wavelength.

Figure 9:
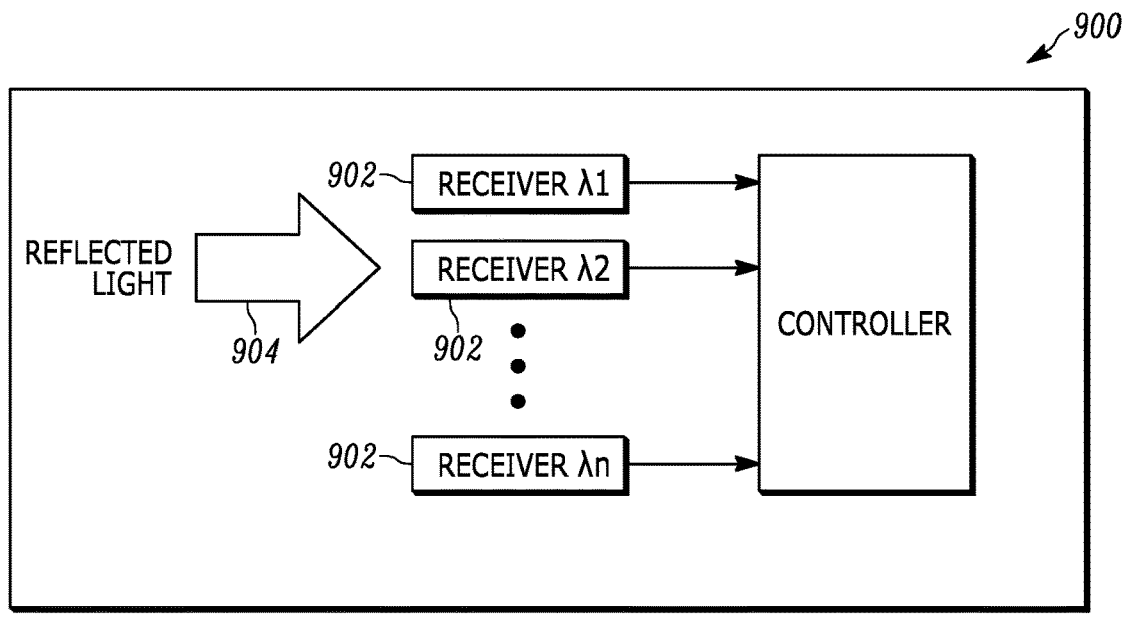
FIG. 9 illustrates an embodiment a receiver that uses multiple-receivers for different wavelengths of the present teaching.

Some embodiments of the multi-wavelength LIDAR system of the present teaching use a receiver comprising multiple receivers that each detect light of different wavelengths independently. FIG. 9 illustrates an embodiment a receiver 900 that uses multiple-receivers 902 for different wavelengths of the present teaching. In this embodiment, the reflected light 904 reflected from an object at a target plane in the range and FOV of the LIDAR system is detected by two or more receivers 902. Each receiver 902 is capable to detect a single wavelength. A multi-wavelength LIDAR system using this embodiment for the receiver can enable simultaneous operation of the different laser wavelengths in which the pulse signals from each wavelength overlapped in time.

In a practical implementation of a LIDAR system, there are physical limits on the speed of the electronics and the optical-electrical bandwidth of various components. A multi-wavelength LIDAR implementation where the laser wavelengths are capable of being detected separately, and simultaneously, can substantially reduce the impact of these physical limits. This results in an overall higher performance LIDAR system.

One feature of the multi-wavelength LIDAR systems of the present teaching is the inclusion of optical performance monitoring in the module. Optical performance monitoring within the LIDAR module may be important for a variety of reasons. For example, incorporating optical power monitoring inside the illuminator assembly can improve calibration, performance, and reliability monitoring. Lasers degrade with lifetime and so it may be useful to monitor the laser output power within the projector assembly itself, as the light is exiting the projector, rather than just relying on the received optical signal after the light has been reflected from an external object. Also, monitoring the temperature proximate to the VCSEL lasers may be useful to improve the reliability and performance. Monitoring the temperature and power can be used not only for diagnostics, but also for controlling the lasers during operation to improve performance and/or lifetime of the system.

Some embodiments of the performance monitor of the multi-wavelength LIDAR system of the present teaching use optical power monitoring. It is well known that monitoring of the laser output power from the transmitter, and comparing it to an expected reference value, will allow detection of degradation in the performance of the optical transmitter, either from the laser itself or the opto-mechanical assembly. For example, U.S. Patent Application Publication No. US 20160025842 A1, entitled "System and Method for Monitoring Optical Subsystem Performance in Cloud LIDAR Systems" describes the benefits of laser output power monitoring for a LIDAR system designed for cloud measurements. Using optical power monitoring in embodiments of the multi-wavelength LIDAR system of the present teaching can improve upon these prior art systems, providing better angular resolution as well as other features of multi-wavelength LIDAR operation.

Power monitoring elements of the present teaching monitor light reflected off of optical devices within the illuminator. The reflected light detected within the illuminator can also be used not just for passive monitoring purposes, but also to provide additional control of the laser current bias. A laser diode has a range of operating bias currents. In many laser systems, not necessarily those for the LIDAR application, lasers are operated in closed loop fashion where the received photodiode current from the monitor diode serves as an input to a bias control loop. By monitoring and maintaining a constant value of the monitor photodiode current, which is a largely linear function of the incident power, the system will be able to react to changes in system stability, such as temperature or mechanical shifts, and to maintain an improved output power stability. Also, this monitoring and control of the laser bias can accommodate some amount of degradation of the laser over its lifetime, without loss of optical power at the system level.

Some embodiments of the performance monitor for LIDAR systems of the present teaching monitor for one or more parameters of the light. The reflected light detected in the illuminator can be monitored for laser wavelength, optical power, pulse timing, and pulse frequency. The wavelength can be detected by using a power monitor including a receiver that is not simply a photodiode, but instead a more complicated set of optics that allows detection of wavelength as well as optical power. In a LIDAR design where multiple wavelengths are used, particularly if the wavelengths are close in absolute value, it may be desired to monitor their absolute or relative values in order to ensure that the system parameters are as intended. Various methods of monitoring either absolute wavelength of the laser, or the relative offset between lasers of different wavelength are known within the art. For example, an etalon-based device could be used as a wavelength monitor.

Multi-wavelength power monitoring also improves the system robustness for detecting whether a fault is caused by laser degradation or shifts in optical performance. Multi-wavelength power monitoring also provides redundancy if one set of wavelengths should fail. A partial or full failure in operation of one set of wavelengths would still allow the ability for partial operation of the system using the other set of wavelengths if the optical monitoring for each wavelength is independent.

Another feature of the multi-wavelength LIDAR systems of the present teaching is that they can be resistant or immune to interference from various optical sources. It is well known that some LIDAR systems can be jammed or fooled using relatively simple laser pointer, or laser range finder technology combined with a method to record and then replay emitted signals from the LIDAR system. It represents a potentially significant risk to safety of the automobile and driver, if a hacker can create fake images of other cars, pedestrians, or even a wall.

Furthermore, as more LIDAR systems are deployed, it becomes increasingly important to have systems that are immune to interference from other LIDAR systems, whether from other vehicles or stationary traffic monitoring. In various embodiments, encryption of the pulse signals may be included. However, even without encryption, the multi-wavelength systems according to the present teaching can confirm that data received is genuine based on wavelength with or without the use of encrypted pulses. For example, some embodiments of the multi-wavelength LIDAR configurations of the present teaching allow the independent use of each wavelength, such that if one wavelength is "jammed", the other wavelength would still be available in order to continue operation. These systems can confirm a potential security risk, and/or enable a controlled response to unintended system interference. Thus, the multi-wavelength LIDAR systems of the present teaching provide enhanced security and prevent blinding, jamming, replay, relay, and spoofing attacks compared to a single-wavelength LIDAR.

Another feature of the multi-wavelength LIDAR systems of the present teaching is improved system accuracy, and/or reduced requirements on the receiver and processing electronics. These benefits are achieved by using multiple wavelengths. Consider the sampling rate required for an automotive LIDAR system. A car moving at 100 kilometers per hour (kph) is traveling at roughly 28 millimeters per millisecond (mm/msec). If two cars are approaching each other, then the relative distance will decrease at twice that rate, or 56 mm/msec. For a system that is accurate across the full field-of-view, with a distance accuracy of 50 mm (~2 inches) for each measurement point, we need to be able to scan the complete FOV during that time.

For simplicity, assume a multi-source LIDAR system using 1,000 laser clusters, corresponding one-to-one with particular desired 3D pointwise measurement locations. For position accuracy across the full FOV, as described above, we would need to scan through all 1,000 lasers every 1 msec. For a single-wavelength system, where we can only operate and detect one laser at a time, this means we have only 1 microsecond (μsec) per laser to acquire the position information for that measurement point. In a multi-wavelength LIDAR system, where we can operate two lasers of different wavelength simultaneously, the time allowed per laser will double and we can have 2 μsec per measurement point. This additional time can be used to improve the performance and/or reliability in or more ways. For example, the additional time can be used to improve the signal integrity, for example, by taking additional samples and averaging. The additional time can also be used to reduce the data rate required for the electronics. In addition, the additional time can be used to implement a more robust coding scheme.

Another feature of the multi-wavelength LIDAR systems of the present teaching is the use of higher-level modulation and coding of the laser pulses. This modulation and coding can take the form of numerous known higher-layer coding techniques for optical signals that are used to improve photon-efficiency of the receiver, encrypt signals and/or increase immunity to interference. By incorporating higher-order modulation instead of sending a simple binary, on/off, pulse, we can enable the implementation of coding/encryption. Coding/encryption is desired because it allows reduction of security risk and interference from other laser systems. Known higher-layer modulation and coding schemes that can be implemented include, for example, pulse position modulation, phase modulation, frequency modulation including sub-carrier frequency modulation, amplitude modulation, polarization modulation, spread spectrum and others.

Figure 10:
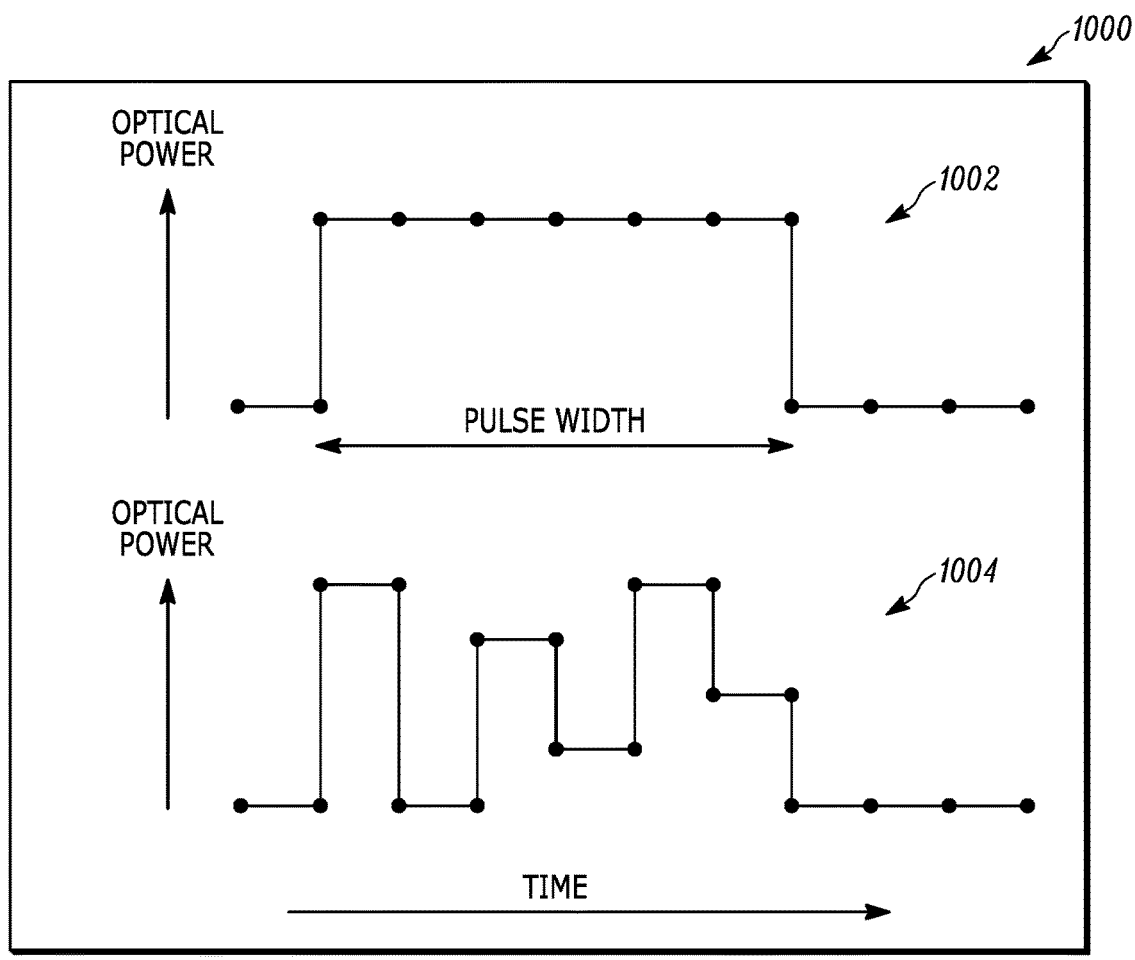
FIG. 10 illustrates an embodiment of a simple coding scheme for a multi-wavelength LIDAR system according to the present teaching.

FIG. 10 illustrates an embodiment of a simple coding scheme 1000 for multi-wavelength LIDAR according to the present teaching. The top graph 1002 presents a simple non-encoded binary pulse optical power as a function of time. The pulse width is typically 30 to 200 nanoseconds (nsec) in length, since most LIDAR systems have an overall window per pulse of only 1 μsec.

The bottom graph 1004 illustrates a simple amplitude based coding scheme, where we have broken down the pulse into six sections, each with four possible levels. The first section might be fixed at maximum power, and used for timing of the TOF measurement, as well as setting the reference signal amplitude for the remaining pulse. The last five sections, however, could be varied in signal level with four possible amplitude levels. The described pulse will then give us 1,024 unique pulse shapes. Thus, each laser in a 1,000 laser LIDAR system can have its own pulse shape or uniquely coded signature. Having each laser with its own uniquely coded signature allows the receiver electronics to decode the signal and identify exactly which laser fired that signal. Security is improved both through the uniquely coded signature of each laser, and by being able to close the loop between receiver and transmitter in terms of matching an expected uniquely coded signature for any given laser pulse and compare to actual pulse received.

Another feature of the multi-wavelength LIDAR systems of the present teaching is the use of parallel processing. Adding higher-order modulation in order to code/encrypt the laser pulses, requires higher speed electronics and more complex signal processing methods. The optical-electrical (O/E) bandwidth of the complete laser circuit, made up of the laser driver, laser, and physical interconnect must be sufficiently high to accommodate the higher-order modulation bandwidth.

The receiver bandwidth can be a constraint. For better optical coupling or to realize more light captured by the receiver, the aperture (i.e. photosensitive area) of the receiver photodiode(s) should be large. However, for improved bandwidth and frequency response, it is desirable to have a smaller aperture size. As such, a compromise can be made. Using multiple-wavelengths can help by enabling parallel processing of measurement points, which effectively creates additional time that can be used to help reduce the system constraints for electronics, bandwidth, and receiver design. For example, referring to FIG. 10, we have depicted the optical pulse shapes with zero rise and fall times. A real system will have finite rise and fall times for the optical signal that, if long enough, would degrade the amplitude modulation. Some embodiments described herein enable overall optimization of the optical-electrical RF performance of the receiver in support of coding/encryption.

In a single-wavelength LIDAR system, or a LIDAR system that does not rely on multiple independent wavelengths, only one laser is typically biased at a time because the receiver cannot distinguish between light from multiple lasers of the same wavelength. It is known, for example, in multi-wavelength communications applications, that systems with more than one wavelength enable simultaneous operation of more than one laser, so-called parallel operation. Similarly, LIDAR systems that use different wavelengths can enable coding/encryption of the pulses at a lower data rate. This results in allowing the use of lower-speed and more inexpensive components, and/or enabling more powerful encryption. This is in part because the receiver can be designed to simultaneously measure the light with different wavelengths. The receiver for a multi-wavelength system might, for instance, might have two separate photodiode elements each filtered to receive only the light from one wavelength.

Early LIDAR systems for automotive applications, including the first self-driving cars, employ a single high-power laser that is reflected off a spinning mirror, where the reflected laser beam is used to perform scanning of the environment. LIDAR systems using a spinning mirror have added complexity and, therefore, there are potential mechanical reliability issues with the moving parts. To avoid the use of a spinning mirror, LIDAR systems have been proposed that replace a single laser, with a plurality of lasers. See, for example, U.S. Pat. No. 5,552,893 entitled "Distance Measuring Apparatus". By using a plurality of lasers, it is no longer necessary to utilize a spinning mirror to perform the scanning. The plurality of lasers can be shifted as a group in some fashion, mechanically or optically, or the number of individual lasers can be sufficient to have a one-to-one relationship with the desired granularity of the pointwise mapping of the environment. In general, it is highly desired to have a "solid state" system with no moving parts for better mechanical reliability, but there is a significant cost and complexity associated with having a plurality of lasers large enough to have a one-to-one mapping.

In some aspects of the LIDAR systems of the present teaching, Vertical Cavity Surface Emitting Laser (VCSEL) arrays are used to provide a plurality of lasers. VCSEL arrays have many desirable features, such as providing a circular beam divergence, being capable of being manufactured on a single substrate, high electro-optic efficiency, and low cost.

As described earlier, some estimates indicate that to provide adequate time to avoid a collision, a LIDAR system should be able to resolve a pedestrian walking in front of the car at a distance of 30 meters. The pedestrian cross section would roughly be 280 mm, so the angular resolution required for the LIDAR system needs to be ~0.5 degrees. For a plurality of lasers to have a one-to-one mapping between the laser and the 3D pointwise mapping of the environment, the number of required lasers is calculated by dividing the system FOV by the angular resolution requirement. A typical LIDAR system might have a 20-degree FOV, which may include 40 lasers to meet the angular resolution requirement to resolve a pedestrian at 30 meters. Note that this calculation is for only one direction, which would generate 2D information. A similar calculation is required for the perpendicular direction. If the system had a 20-degree FOV, both horizontal and vertical, 1,600 lasers would be required. A system using 1,600 separate lasers presents significant challenges for complexity of operation, assembly, and cost. Known LIDAR systems disclose using a smaller number of lasers, but shifting them as a group to achieve the required resolution using various devices, such as voice coils, piezoelectric transducers, stepper motors, shape memory translators, and vibratory motors. See, for example, U.S. Pat. No. 7,544,945 entitled "Vertical Cavity Surface Emitting Laser (VCSEL) Array Laser Scanner"

Some known LIDAR systems use an array of VCSELs together with a moveable lens system to shift the beams. As the lens is moved, each laser beam is pointed in a different direction. Full mapping of the field-of-view is achieved by selectively electrically biasing each laser, combined with appropriate movement of the lens system. VCSEL arrays can be formed from a plurality of individual VCSEL chips, or sub-arrays of VCSEL chips. The movable lens can be actuated by a piezoelectric transducer or other mechanical means. See, for example, U.S. Pat. No. 6,680,788 entitled "Scanning Apparatus and Associated Methods"

Some embodiments of LIDAR systems according to the present teaching use a plurality of semiconductor lasers with lasers having more than one laser wavelength. Specific embodiments described herein include using semiconductor lasers of different wavelengths to enable a LIDAR system with relatively higher granularity for 3D pointwise mapping as compared to single laser wavelength system. One feature of the present teaching is that the relatively higher granularity for 3D pointwise mapping can be achieved without requiring the use of a movable lens system or other movable parts within the LIDAR system.

Embodiments of LIDAR systems according to the present teaching that use multiple laser wavelengths can significantly improve upon the granularity, or angular resolution, as compared to a system using only one laser wavelength, while maintaining a compact mechanical size for the overall system. As described previously, it is highly desired that an automotive LIDAR system have a granularity of less than 0.5 degrees for each measurement point across the FOV in order to be able to detect a pedestrian at 30 m with high accuracy. A perfectly collimated light beam is one that has zero degrees of divergence, but in a real system, it is understood that the properties of the emitted laser light beam, as well as deviations from ideal in the optics and mechanical assembly, prevent the realization of a perfectly collimated light beam.

There are two general methods for collimating lasers beams in LIDAR systems that have a plurality of lasers. In the first method, the light from each individual laser is collimated separately, by its own dedicated lens or lens system. In the second method, collimation of multiple laser beams is performed with a shared optical system.

Another prior art LIDAR system comprises lasers located on a curved substrate and uses individual lenses for each laser. See, for example, U.S. Patent Publication No. 2015/0219764 entitled "Low Cost Small Size LIDAR for Automotive." This patent application describes a system with an FOV and collimation that can be independently set. That is, the degree of collimation can be controlled by the individual set of optics used for each laser, independent of the desired FOV. However, there are physical limits to the collimation. A VCSEL device has both a finite beam diameter, as well as a finite divergence angle. For a typical 850 nm VCSEL device, with a numerical aperture (NA) of 0.2, a refractive optic with a focal length (and physical diameter) of several mm would be required, to produce a beam with less than 0.5 degree divergence. The diameter of the individual lenses will physically limit the spacing between adjacent lasers. It should be noted that the individual lens systems used for collimation of the light from the plurality of lasers, might be in the form of an array, rather than physically separate elements. However, the limits on the spacing of the adjacent lasers will still be a factor.

Some prior art LIDAR systems use a plurality of VCSELs arranged in a pattern on a substrate combined with a one-to-one plurality of micro-lenses formed over each VCSEL device. See, for example, U.S. Patent Publication No. US2015/0340841 A1 entitled "Laser Arrays for Variable Optical Properties." Each lens will both collimate, and set the projection angle for the laser beam from the VCSEL device. A pointing angle can be achieved by offsetting the primary lens axis from the VCSEL center axis. The VCSELs in some known LIDAR collimation systems are back-side illuminating and the lenses are on the opposite surface of the substrate from the VCSEL apertures. In these VCSELs, the substrate needs to be transparent to the wavelength of the VCSELs. It is also possible to use top-side illuminating VCSELs and form the lenses on the same surface as the VCSEL apertures.

Some prior art LIDAR systems using multi-emitter VCSELS have a compact design with the lenses and spacing of the VCSEL elements on the order of a few hundred microns. These systems provide an optical system essentially on the same mechanical scale as the VCSEL array chip. However, these systems suffer from significant drawbacks, including an inability to achieve a small angular resolution because the divergence from an individual device cannot be arbitrarily low. Such a system will be constrained in performance by the size and curvature of the lenses. In such a system, divergence cannot be set arbitrarily small, particularly for the devices where the lens and emitting VCSEL aperture are offset. The beam diameter and the divergence are linearly related.

By inspection, we know the magnification of this system is small, and that the laser beam diameter cannot be significantly expanded by such a lens system. For this approach to have divergence of less than 0.5 degree, the numerical aperture of the VCSEL device itself must start out to be small initially, much lower than typical 0.2 NA for an 850 nm top-side illuminated VCSEL. Requiring an inherently small numerical aperture for the VCSEL device may limit the practicality of this approach by impacting the VCSEL output power and wavelength. Also, since the same lens is used for collimation and for setting the projection angle, this places an additional constraint on the lens design as the radius of the lens becomes dependent on the desired projection angle, which is likely not the same lens radius as the optimum radius for collimation.

The second method of collimation found in prior art LIDAR systems that include a plurality of lasers at a single wavelength is to use a shared optical system to collimate multiple lasers. In some of these systems, a single large lens is used to both collimate as well as set the projection angle of each VCSEL device. It should be noted that instead of a single lens, two or more lenses could be used as well, without changing the underlying concept of a shared lens system for collimation. One aspect of using a shared optic for both collimation and projection angle is that there is a direct mapping between the lateral position of the VCSEL device relative to the central axis of the lens and the pointing angle of the projected laser beam. The lateral distance between two VCSEL lasers of the same, or similar, wavelength will correspond to the difference in projection angles created by the shared lens system.

Furthermore, since the VCSEL device is not an ideal point source, but instead has a finite lateral size, there will be an additional divergence that cannot be reduced by the optics without also shrinking the FOV of the overall optic system. Also, the shared-optic approach using lasers with the same or similar wavelength may lead to beam overlap or gaps in the 3D measurement span depending on the finite size of the VCSEL, the divergence of the collimated beams, the number of VCSEL devices, and the FOV, among other parameters.

One feature of LIDAR systems of present teaching is the use of VCSEL chips with clusters of emitting apertures to take advantage of the higher optical power and large diameter cluster provided by these devices. As described herein, a VCSEL device is not an ideal point source, but rather has a finite lateral dimension. Furthermore, high-power top-emitting VCSEL lasers used for LIDAR illumination typically use multiple light emitting apertures to reach the required high-power output. These multiple apertures form a cluster or group, and ideally are located as close as physically possible, while still maintaining the required electro-optic efficiency.

Figure 11:
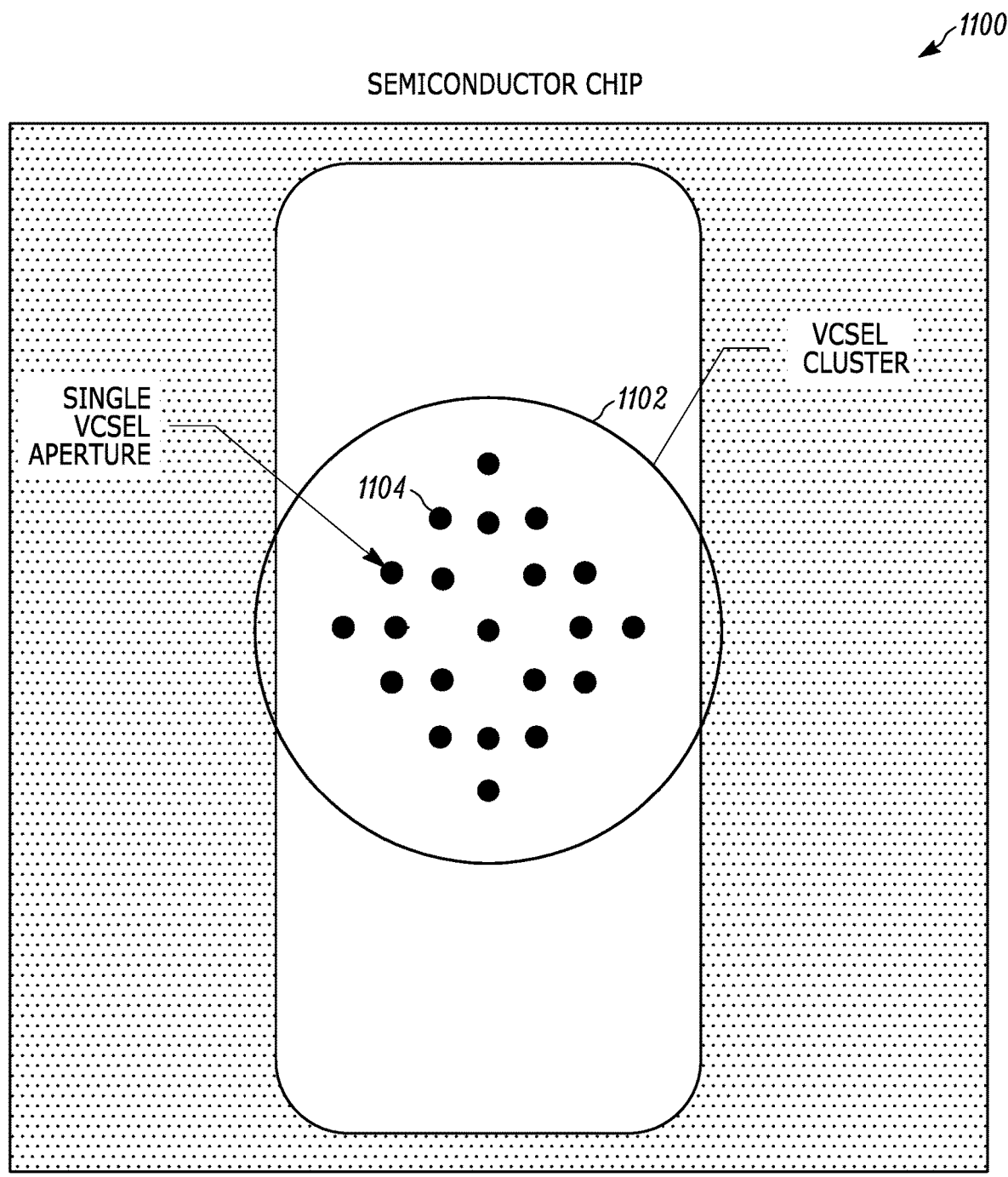
FIG. 11 illustrates a drawing of a prior art cluster VCSEL device that comprises a cluster formed by twenty-one individual apertures.

FIG. 11 illustrates a drawing of a prior art cluster VCSEL device 1100 that comprises a cluster 1102 formed by twenty-one individual apertures 1104. The twenty-one individual light emitting apertures 1104 form a cluster 1102. The VCSEL apertures 1104 within the VCSEL cluster 1102 are electrically connected in parallel and so must be biased together. The required output power from the cluster VCSEL device 1100 differs for each system design, but generally exceeds 1 W of peak optical power during pulsed operation, in order for the overall LIDAR system to meet acceptable signal-to-noise ratio. See, for example, U.S. Pat. No. 8,247,252 entitled "High Power Top Emitting Vertical Cavity Surface Emitting Laser."

Some critical parameters in the design of the optical system are the lateral size (dimension) of a cluster VCSEL chip, the diameter of the VCSEL cluster 1102 combined with the numerical aperture of the individual VCSEL apertures 1104. These parameters will determine the lens requirements for collimation. The larger the lateral dimension of the VCSEL cluster 1102, the larger the focal length required for collimation. Larger lateral dimensions generally lead to a physically larger optics system.

Figure 12A:
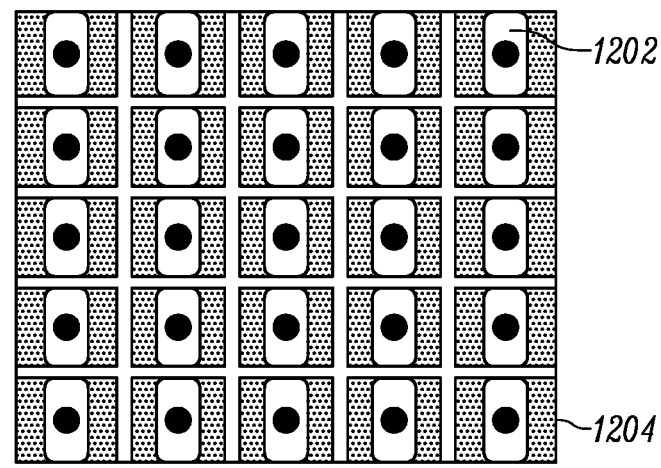
FIG. 12A illustrates a chip comprising multiple cluster VCSEL devices arranged individually.

One feature of using VCSEL devices in LIDAR systems according to the present teaching is the ability to have multiple cluster VCSEL devices on a single chip. FIG. 12A illustrates an array 1200 comprising multiple cluster VCSEL devices 1202. FIG. 12A illustrates a twenty-five cluster VCSEL devices 1202 in a two-dimensional array. The array is formed with contacts 1204 for twenty-five individual cluster VCSEL devices 1202 that can be individually biased.

Figure 12B:
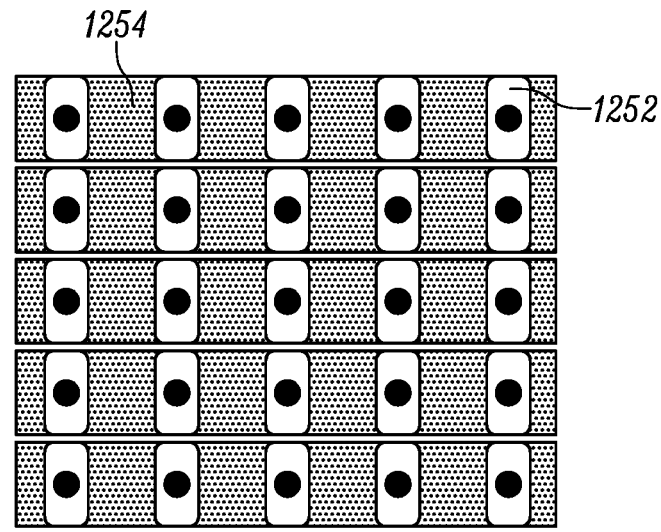
FIG. 12B illustrates a chip comprising multiple cluster VCSEL devices arranged in bars.

FIG. 12B illustrates an array 1250 comprising multiple cluster VCSEL devices 1252. FIG. 12B illustrates that the array is arrange to include five cluster VCSEL devices 1252 connected with contacts 1254 that form five bars with each bar including five cluster VCSEL devices 1252. It will be evident to those familiar with the art that a single monolithic 2D VCSEL array can be produced as well.

Figure 12C:
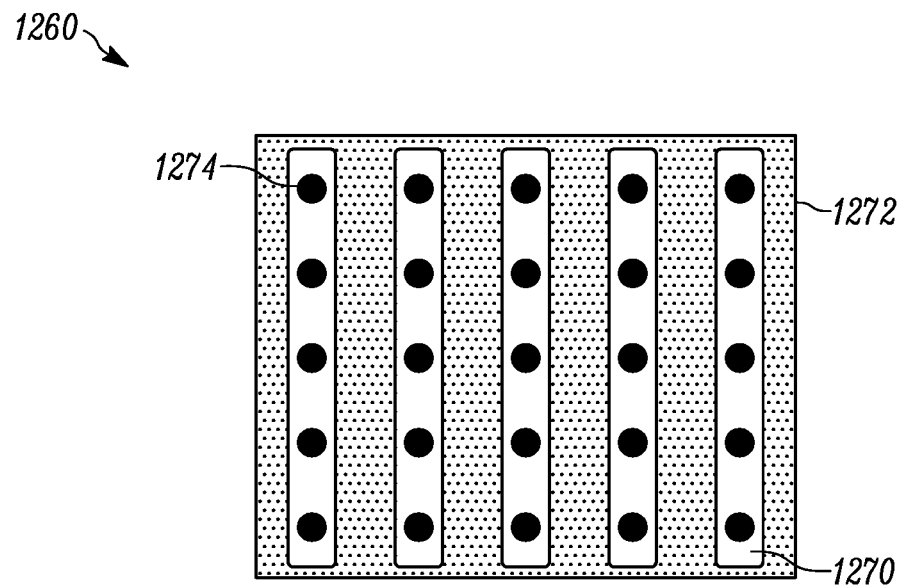
FIG. 12C illustrates a top-view of an anode metal contact pad of a chip comprising multiple cluster VCSEL devices of the present teaching.

FIG. 12C illustrates a top-view of an anode metal contact pad 1270 of a chip 1272 comprising multiple cluster VCSEL devices 1274 in a 2D monolithic VCSEL array. The chip illustrated in FIG. 12C is a top-side illuminating VCSEL array. All the anodes of all VCSEL in a single column are connected together with a single metal contact.

Figure 12D:
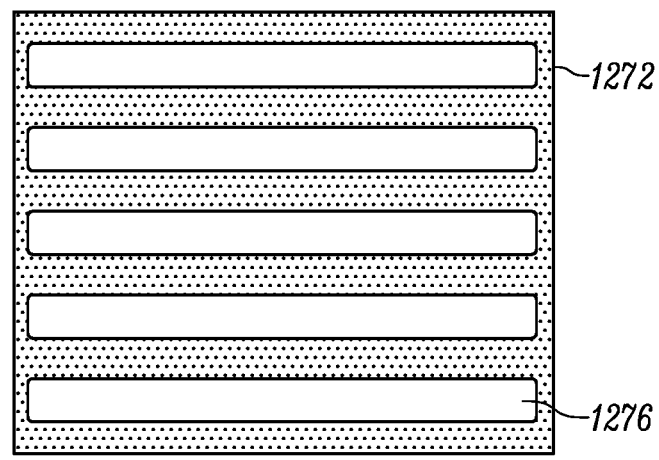
FIG. 12D illustrates a bottom-view of a cathode metal contact pad of the chip comprising the multiple cluster VCSEL devices illustrated in FIG. 12C.

FIG. 12D illustrates a bottom-view of a cathode metal contact pad 1276 of the chip 1272 comprising the multiple cluster VCSEL devices illustrated in FIG. 12C. All the cathodes in a single row are connected together with a single metal contact. With this pattern of metallization, individual VCSEL devices 1274 (FIG. 12C) can be operated by biasing each row and column contact at the desired bias level. For this particular embodiment with 5 rows and 5 columns, only 10 electrical connections are required versus 25 electrical connections if the VCSEL devices 1274 were individually connected. One skilled in the art will appreciate that this is one of numerous possible electrical addressing configurations and that the present teaching is not limited to particular row and column geometries for the emitters. This advantage in reducing the number of electrical connections is greater as the size of the 2D VCSEL array increases. In general, when the anodes of one group of laser emitters is connected to one contact, and the cathodes of a second group of laser emitters is connected to a second contact, only those individual lasers belonging to both the first and second group of laser emitters, i.e. those that have an anode and a cathode connected, will be energized when the first and second contacts are appropriately biased. The use of one contact connected to anodes of one group of laser emitters and a second contact connected to cathodes of a second group of laser emitters can be used to energize one laser emitter, or groups of laser emitters, for a particular bias condition, depending on the configuration of the connections.

Prior art LIDAR systems do not utilize different laser wavelengths to enable improvements to the angular resolution of the LIDAR system. One feature of the LIDAR systems of the present teaching is that they use multiple laser wavelengths to enable finer angular resolution and performance in a low-cost, compact optical design. Furthermore, multi-wavelength LIDAR systems of the present teaching provide a simple path to improved security and parallelization as described herein.

Figure 13:
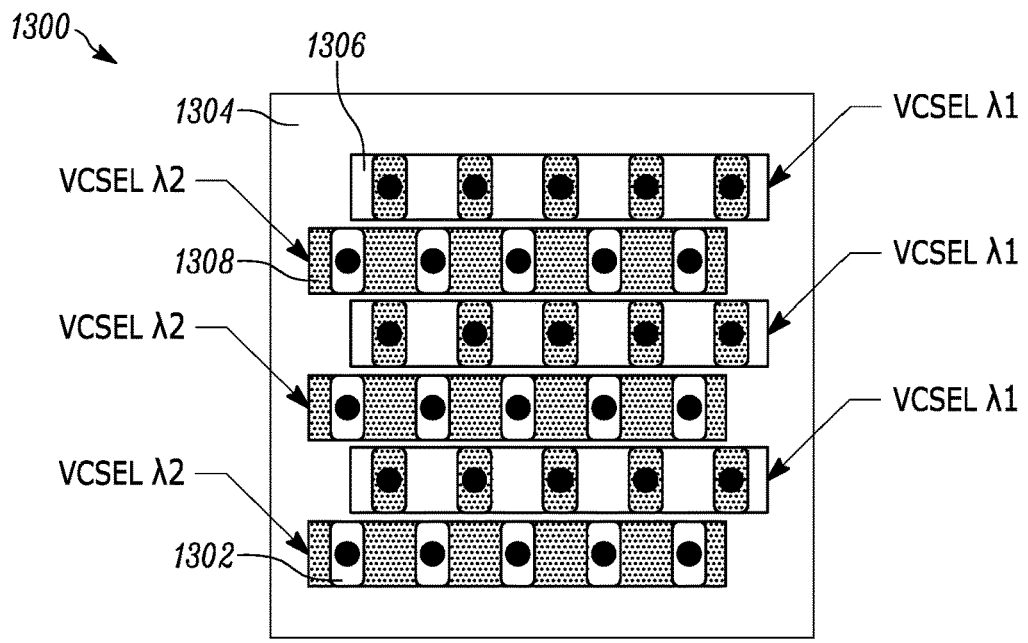
FIG. 13 illustrates an embodiment of a multi-emitter laser source for a multi-wavelength LIDAR system of the present teaching.

One feature of the LIDAR systems of the present teaching is the use of multiple wavelength laser sources for a LIDAR system that uses a shared lens system to both collimate and project the laser beams over a desired field-of-view. FIG. 13 illustrates an embodiment of a multi-element emitter laser source 1300 for a multi-wavelength LIDAR system of the present teaching. A plurality of lasers including cluster VCSEL devices 1302 are all located on a common surface 1304. The surface may be flat, as shown, or curved.

FIG. 13 illustrates a multi-element emitter laser source 1300 with two different VCSEL wavelengths interleaved uniformly in the vertical direction. The embodiment shown in FIG. 13 illustrates a single common substrate 1304, but it will be clear to those skilled in the art that multiple substrates could also be used. There are six VCSEL bars 1306,

1308. The cluster VCSEL devices 1302 of the bars 1306 emit at one common wavelength. These are the bars 1306 labeled "VCSEL λ1" in the figure. The cluster VCSEL devices 1302 of the dark bars 1308 emit at a different wavelength. The bars 1308 are labeled "VCSEL λ2" in the figure. A total of thirty cluster VCSEL devices 1302 are shown.

Figure 14:
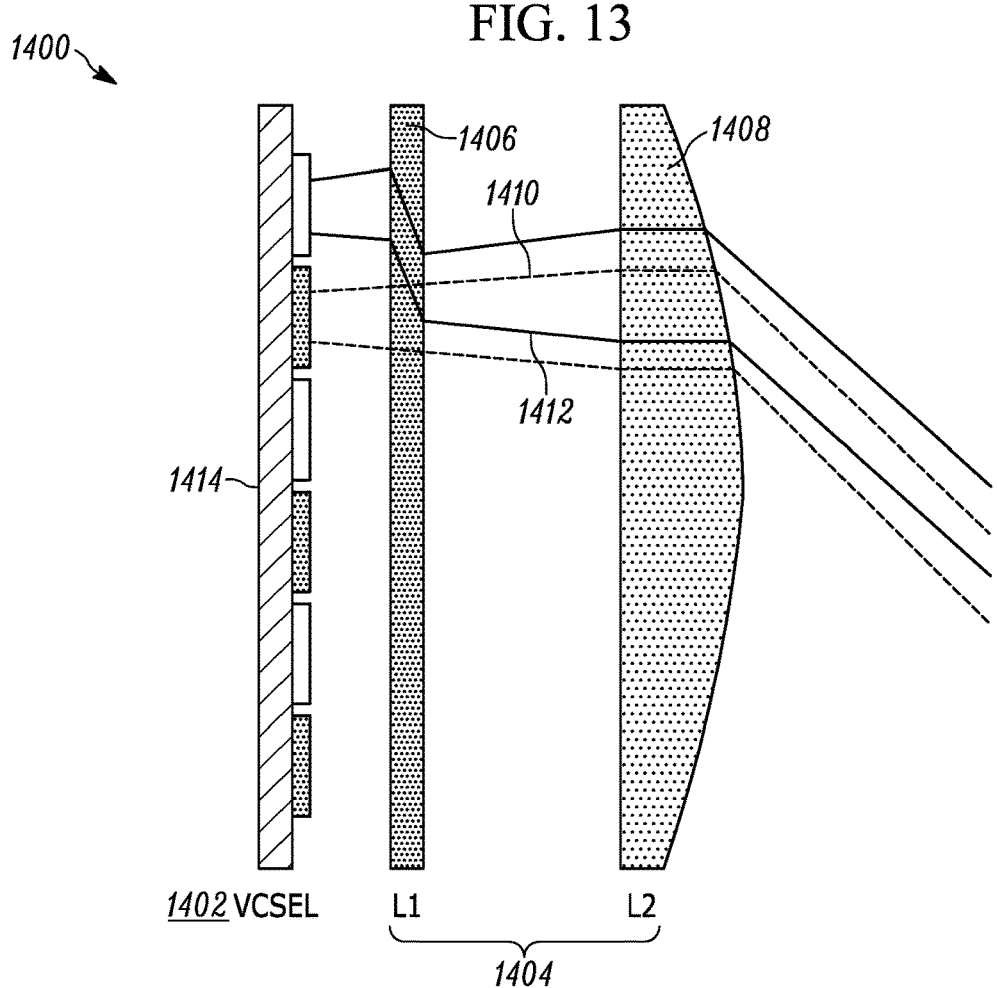
FIG. 14 illustrates a diagram of the cross-section of an embodiment of an illuminator for a multi-wavelength LIDAR system of the present teaching.

The illuminator used in connection with the multi-element emitter laser source 1300 of FIG. 13 uses a shared lens system for both collimation and projection of the beams over the desired FOV. FIG. 14 illustrates a diagram of a cross-section of an embodiment of an illuminator 1400 for a multi-wavelength LIDAR system of the present teaching. The illuminator 1400 includes the multi-emitter laser source 1402, and a projection element 1404 comprising a wavelength multiplexer 1406 and a lens 1408. The projection element 1404 is used to project the laser beams 1410, 1412 emitted from the laser source 1402. The emitters for the multi-emitter laser source 1402 are located on a VCSEL substrate 1414. FIG. 14 illustrates how the light from two VCSEL bars, of different wavelength, travels through the system. For clarity, only the laser beams 1410, 1412 from two VCSEL emitters are shown ray traced.

In FIG. 14, the projection element 1404 comprises two optical devices 1406, 1408. The first optical device is a wavelength multiplexer 1406 that is a wavelength sensitive optic that acts to combine the laser beam 1410 at one of the two wavelengths and from one optical path with the laser beam 1412 at the other of the two wavelengths that is on another optical path onto a common optical path. In some embodiments, wavelength multiplexers comprise a diffractive optic that is designed to substantially shift the optical path of one wavelength while letting the second wavelength pass through undisturbed. Diffractive optics elements are well known in the art and can be used to provide precise beam steering and beam shaping of lasers. In addition, diffractive optical elements can be wavelength selective. In other embodiments, an array of refractive optics, such as prisms, is used. The second device is a lens 1408 that is used to further project and shape the laser beams 1410, 1412 to form a desired pattern of beam shapes and beam positions at the target plane of the LIDAR system.

Light from the beam profiles formed at a target plane by the illuminator is reflected from the surface of objects in that target plane. A target plane in a LIDAR system is a virtual reference point that operates over a complete range and FOV. There are many different target planes at various distances from the LIDAR module such that the system can generate three-dimensional representation of the objects in the field-of-view and range being probed by the LIDAR system.

A portion of the light reflected of the surfaces of objects illuminated by the optical beam profiles in the target plane is directed to receivers. The receivers detect the light, converting the received optical signal to an electrical signal. A controller, connected to the light sources and to the receiver, converts the received signal into a measurement point cloud. The angular resolution of points in the measurement point cloud depends of the relative position of the beam profiles at a target plane, as described further below. It will be clear to those skilled in the art that many other variations of the embodiment of the illuminator 1400 illustrated in FIG. 14 exist. For example, VCSEL lasers may be located in a common surface, either planar or curved. It will also be clear that some deviation of the VCSEL away from a central surface, curved or flat, is allowed without changing the principles of the embodiment of FIG. 14.

Figure 15A:
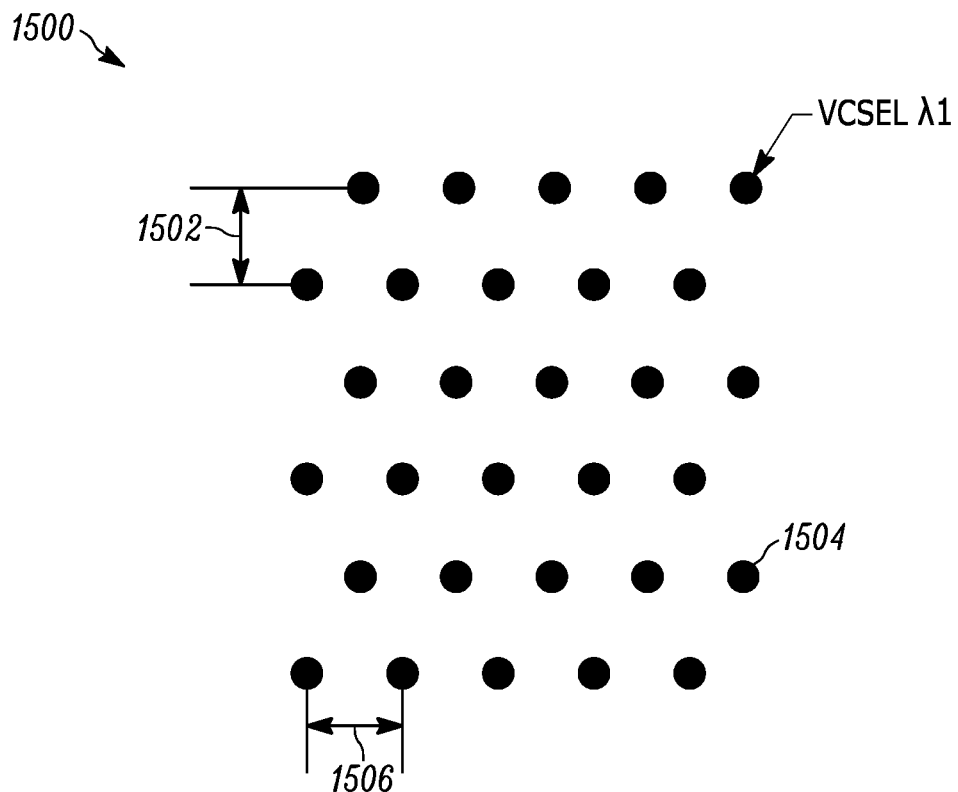
FIG. 15A illustrates a measurement point cloud for an embodiment of a single-wavelength 2D multi-emitter laser source illumination of the present teaching.

FIG. 15A illustrates a measurement point cloud 1500 for an embodiment of a single-wavelength 2D laser source illumination of the present teaching. The distance represented between the vertical spacing 1502 of the measurement points 1504 determines the vertical angular resolution and horizontal spacing 1506 of the points on the point cloud determines the horizontal angular resolution of the point cloud.

Figure 15B:
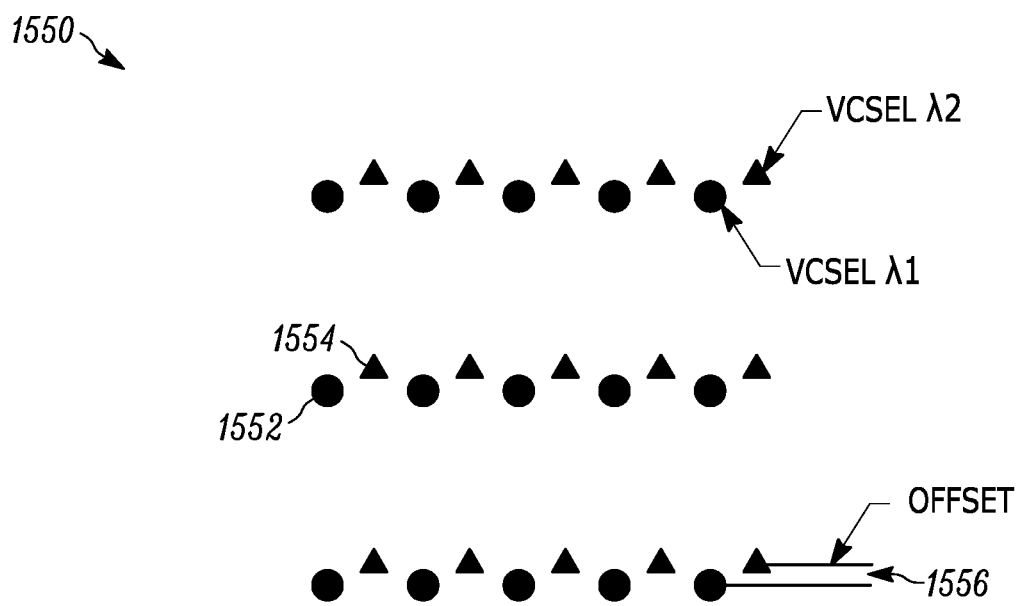
FIG. 15B illustrates a measurement point cloud for an embodiment of a two-wavelength 2D multi-emitter laser source illumination of the present teaching.

FIG. 15B illustrates a measurement point cloud 1550 for an embodiment of a two-wavelength 2D laser source illumination of the present teaching. A measurement point corresponding to a VCSEL with λ1 is shown as a circle 1552, a measurement point with a VCSEL with λ2 is shown as a triangle 1554. It is useful to think of this measurement point cloud as a composite point cloud that includes a point cloud derived from reflections received at λ1 and a point cloud derived from reflections received at λ2.

The measurement point cloud 1550 illustrated in FIG. 15B can be realized using the multi-emitter laser source with the pattern of VCSEL emitters of different wavelengths illustrated in FIG. 13 together with the illuminator configuration of FIG. 14. Part of the light from optical beams generated by the illuminator at the target plane is reflected by the surface of an object and incident on one or more optical receivers that are capable of detecting light at particular wavelengths. The resulting measurement point cloud 1550 includes points representing light from the different beam profiles that are at different wavelengths.

Referring to FIGS. 13-15, different wavelength VCSEL bars 1306, 1308 occupy different rows of the laser source in the vertical direction, and individual VCSEL devices 1302 in different rows have their centers offset in the horizontal direction. The optical beams from emitters in different wavelength bars are projected by the projection element 1404 so that the optical beam positions are slightly offset at the target plane in the vertical direction. This causes the offset 1556 in the measurement point cloud. The offset in the center position of the VCSELs in adjacent bars, together with the design of the projection element causes the measurement points representing each wavelength to be interleaved horizontally along the offset vertical lines. The angular resolution of the measurements in a given dimension is directly related to the offset of the points in that dimension, which is related directly to the positions of the optical beams in that dimension at the target plane.

Referring to both FIG. 15A and FIG. 15B, a performance tradeoff associated with using a two-wavelength solution is clear. In the embodiment of FIG. 15B, the optical beams at one wavelength travel substantially uninterrupted, but the optical beams at the second wavelength are intentionally shifted in position to substantially overlap in one direction with the optical beams at the first wavelength. The offset 1556 in position of the optical beams at each wavelength indicated in the drawing in FIG. 15B can be adjusted based on the design of the wavelength multiplexer. For example, in some embodiments, this requires appropriate design of the wavelength multiplexer 1406 in FIG. 14. In various embodiments, various devices in the projection element are used to position the beams of the lasers at the two wavelengths. These same devices, or other devices, may alter the beam shapes as well their positions at the target plane.

As compared to the single wavelength embodiment of FIG. 15A, the embodiment of FIG. 15B doubles the angular resolution in a preferred direction, in this case the horizontal direction, at the expense of halving the angular resolution in the perpendicular direction, while keeping the overall physical size of the system relatively constant. In some applications, finer resolution in one direction may be preferred or necessary, for instance if instead of a pedestrian, the system needs to distinguish a pole or tree with a cross-section of only 100 mm. At 30 m, we would need an angular resolution less than 0.15 degrees. Poles and trees are tall but narrow, and so it could be highly desired to have a very small angular resolution in the horizontal direction, at the expense of wider angular resolution in the vertical. In some embodiments, the angular resolution of the measurement point cloud is less than 0.4 degree at a predetermined distance from the target plane to the optical projection element.

Figure 16:
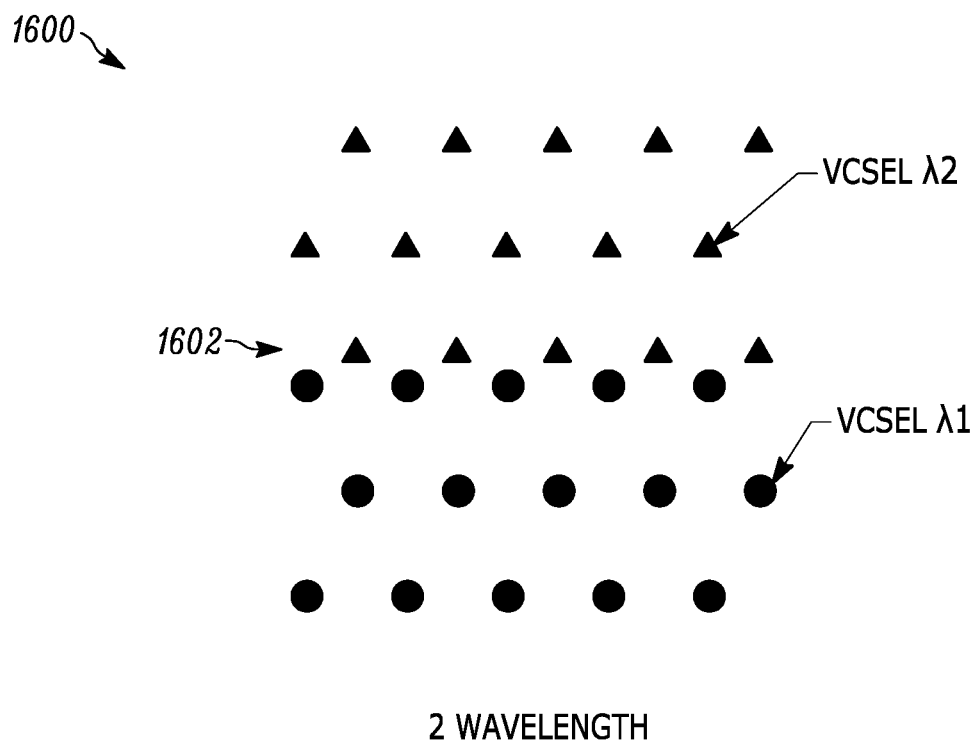
FIG. 16 illustrates a measurement point cloud for an embodiment of another two-wavelength LIDAR of the present teaching.

FIG. 16 illustrates a measurement point cloud 1600 for an embodiment of the two-wavelength LIDAR of the present teaching. In this embodiment, we have not given up any resolution in the vertical direction, but have been able to add a single line 1602 with double the angular resolution. At this one vertical position of line 1602 in the FOV, we have double the angular resolution horizontally. It should be also noted that, at the central position, we have redundancy in the event one set of VCSEL wavelengths fail to operate. Multiple lines like single line 1602 can be added at the expense of complexity of the multiplexer.

Figure 17:
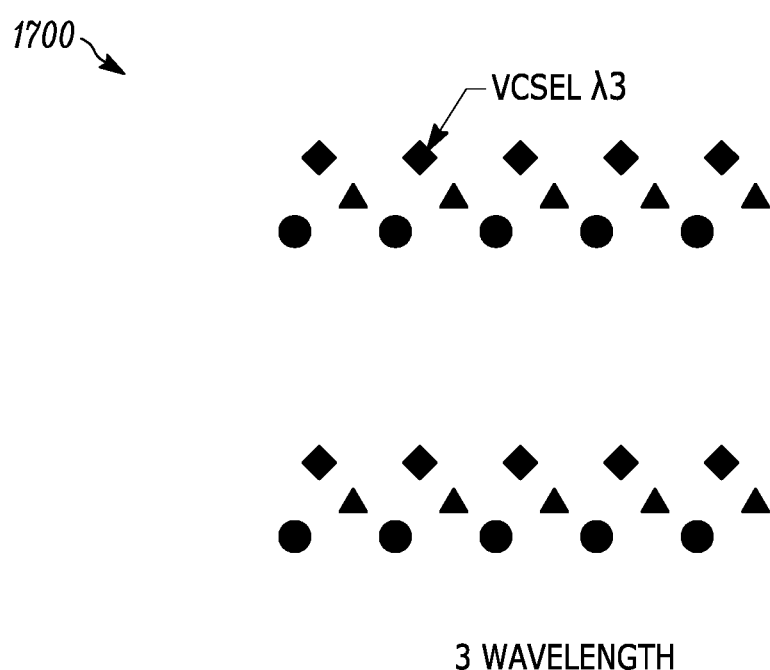
FIG. 17 illustrates a measurement point cloud for an embodiment of a three-wavelength LIDAR of the present teaching.

FIG. 17 illustrates a measurement point cloud 1700 for an embodiment of a three-wavelength LIDAR of the present teaching. In this embodiment, the measurement point cloud is generated by adjusting the beam position at a target plane for three wavelengths. The field-of-view and resolution provided by this measurement point cloud is dependent on the details of the beam profile provided by the laser source and projection element. In some embodiments, the profile is provided by collimating the laser emitters using a lenslet. In some embodiments, the lenslet is integrated with the VCSEL device. The collimated beams at the multiple wavelengths are positioned and directed to wavelength sensitive element that projects the beams at different wavelengths along a common direction toward the target. With proper design of the wavelength sensitive element, and physical layout of the VCSEL, we can generate a system with 3× the angular resolution in one direction, at the expense again of about ⅓ resolution in the perpendicular direction as illustrated in the measurement point cloud 1700. Because light from each of the three wavelengths is independently received, the position represented by each measurement point can partly, or completely, overlap, increasing the resolution of the measurement point-cloud and/or providing redundant measurement points. In the embodiment of FIG. 17, the increased resolution of the measurement point cloud 1700 is provided in a horizontal direction. In various embodiments, the direction of higher angular resolution can also be changed, becoming vertical or even diagonal depending on layout of the VCSEL devices and specific design of the wavelength multiplexer.

One feature of the present teaching is that the light sources that are either single element emitters or multi-element emitters operating at different wavelengths do not need to be located on the same surface, and the surfaces may be oriented along different spatial planes in three-dimensional space. For example, the planes may be on two orthogonal planes. In some embodiments, we use a plurality of surface emitting lasers made up of at least two groups of lasers with different wavelengths. We also make use of three-dimensional space and each group of lasers are oriented in two or more surfaces, planar or curved, that are not necessarily orthogonal. In this embodiment, the packaging and optical alignment complexity increases relative to embodiments in which the lasers are co-located on a common surface, but we are able to increase the resolution angle across the full field-of-view in both orthogonal directions, without any compromise. This provides both higher precision as well as full access to all the capabilities associated with more than one wavelength. That is, it is possible to realize simultaneous operation, redundancy, security and other features of multi-wavelength operation.

Figure 18:
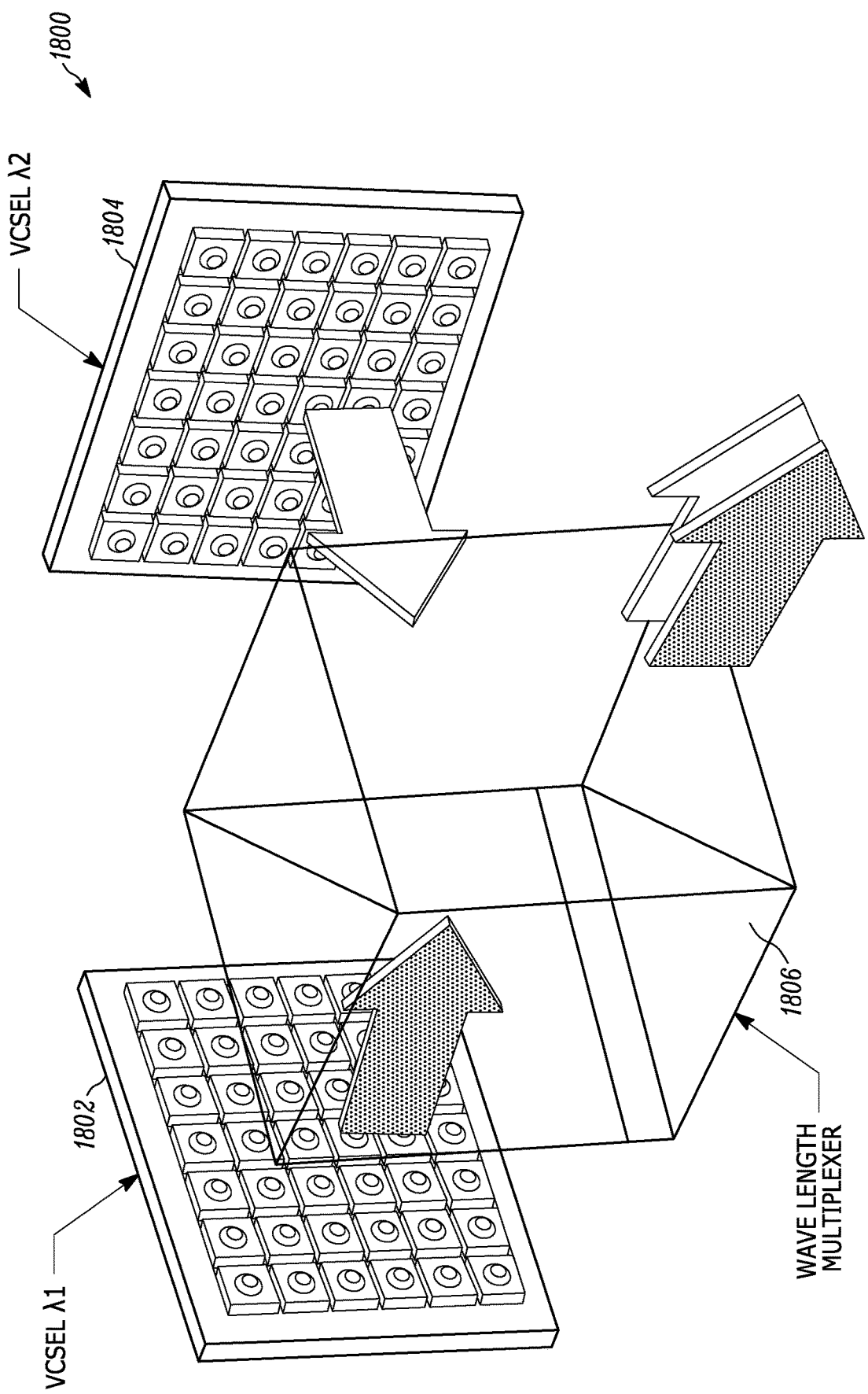
FIG. 18 illustrates an embodiment of an illuminator for a multi-wavelength LIDAR system of the present teaching.

FIG. 18 illustrates an embodiment of an illuminator 1800 for a multi-wavelength LIDAR system of the present teaching. In this embodiment, we use a plurality of surface emitting lasers made up of at least two groups of lasers with different wavelengths, VCSEL $\lambda 1$ 1802, and VCSEL $\lambda 2$ 1804. We also make use of three-dimensional space and VCSEL $\lambda 1$ 1802, and VCSEL $\lambda 2$ 1804 are oriented in two surfaces that are orthogonal. The beams are combined by use of a wavelength multiplexer 1806 that passes one wavelength, while reflecting the second wavelength.

FIG. 18 illustrates an essential principle of combing the light from two sets of lasers VCSEL $\lambda 1$ 1802, and VCSEL $\lambda 2$ 1804, with two different wavelengths. One set of emitters of one wavelength, VCSEL $\lambda 1$ 1802, is on a common surface. The second set of emitters of a different wavelength, VCSEL $\lambda 2$ 1804, is on a second surface, oriented orthogonally. The wavelength multiplexer 1806 can be realized, for example, by use of a thin film filter that allows the first wavelength to pass through undeflected, while the second wavelength is deflected at 45 degrees, and the output beams are combined. For simplicity, we have shown the multiplexer 1806 in the shape of cube formed by two equal prisms of triangular cross-section, where the thin film filter that reflects or passes the wavelengths is located at the central plane of the cube, where the two triangular prisms touch.

Figure 19:
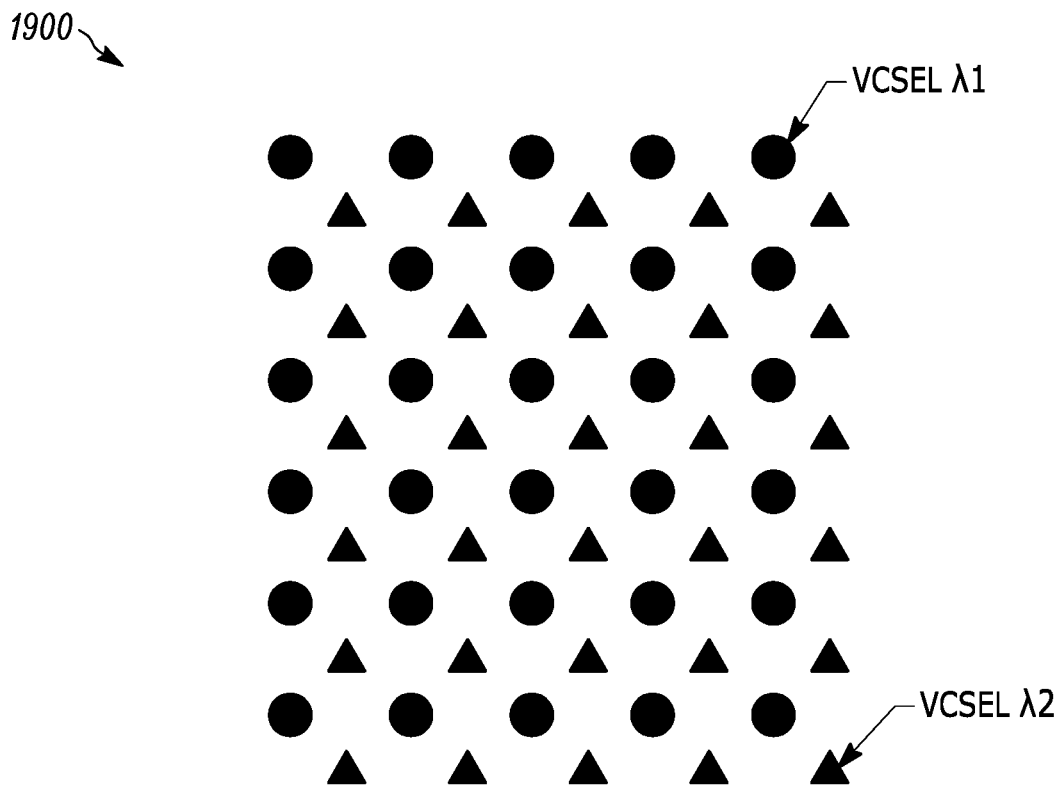
FIG. 19 illustrates a measurement point cloud that can be generated with the illuminator embodiment of FIG. 18.

The positions of the two substrates of VCSEL $\lambda 1$ 1802, and VCSEL $\lambda 2$ 1804 can be shifted laterally, relative to the wavelength multiplexer 1806 to create the desired overlap or interleaving of the two beams. FIG. 19 illustrates a measurement point cloud 1900 that can be generated with the illuminator embodiment of FIG. 18.

One feature of the present teaching is providing a multi-wavelength LIDAR system where each wavelength has a different angular resolution. The beam profiles of the different wavelengths can be substantially different in order to allow for different operating ranges. For these embodiments, we make use of the fact that we have a receiver that can separately detect multiple-wavelengths.

Figure 20:
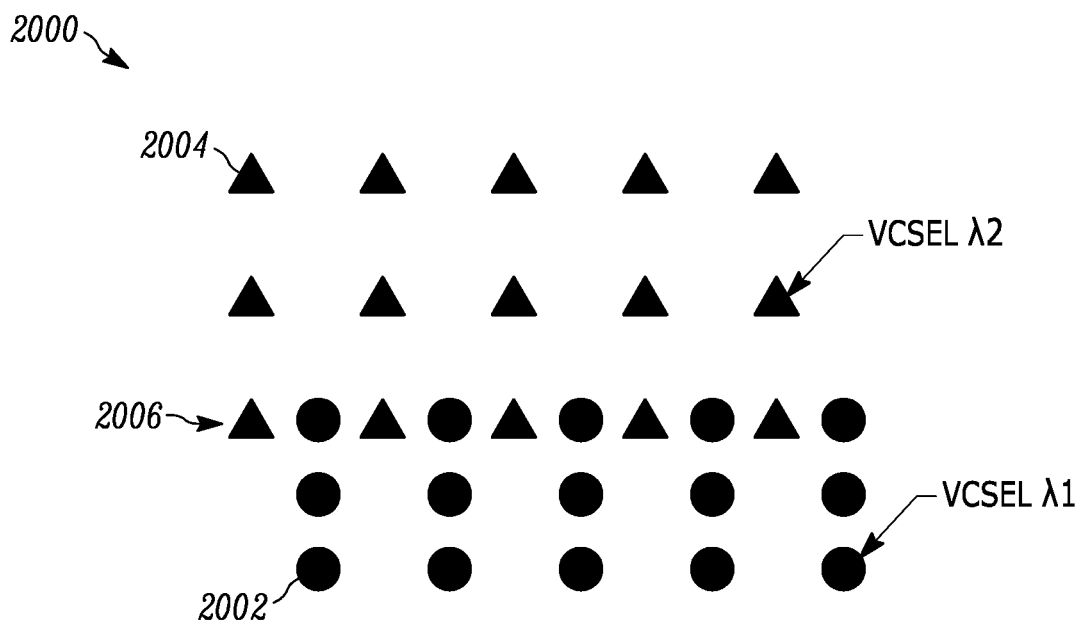
FIG. 20 illustrates an embodiment of a measurement point cloud generated using two multi-emitter sources in a multi-wavelength LIDAR configuration of the present teaching.

FIG. 20 illustrates an embodiment of a measurement point cloud 2000 generated using two multi-element emitter sources in a multi-wavelength LIDAR configuration of the present teaching. As can be seen from the points 2002 of the measurement point cloud 2000 generated from a first wavelength, and the points 2004 generated from the second wavelength, each wavelength has a different angular resolution in the vertical axis. Thus, the vertical resolution of the measurement point cloud for the two wavelengths is substantially different, in this case by a factor of two.

In the embodiment of FIG. 20, there is also a region of overlap of the two wavelengths at a line 2006, which results in a higher angular resolution at that location. Such a design enables lower cost and complexity because it relies on fewer VCSEL lasers to realize a particular resolution as compared to a single wavelength design. For some particular applications, a sparser 3D measurement may be acceptable in the vertical FOV. One such example, is when the vertical height is taller than the vehicle. In the embodiment shown in FIG. 20, the change in angular resolution is generated from an asymmetric layout of the VCSEL devices on their substrate(s).

Figure 21:
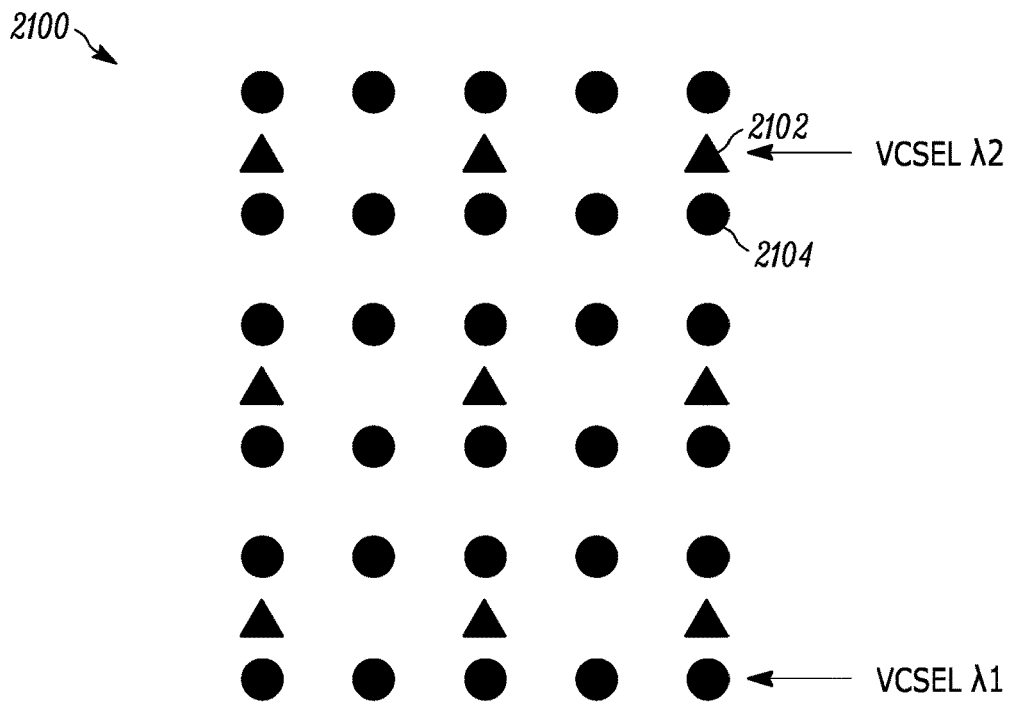
FIG. 21 illustrates a measurement point cloud generated by an embodiment of a multi-wavelength LIDAR where the density of measurement points at one wavelength across the full field-of-view is half that of a second wavelength according to the present teaching.

FIG. 21 illustrates a measurement point cloud 2100 generated by an embodiment of a multi-wavelength LIDAR where the density of measurement points 2102 from one wavelength across the full field-of-view is half that of the measurement points 2104 of a second wavelength according to the present teaching. This configuration is desirable if the second wavelength is used in a different manner then the first wavelength. For example, if the two wavelengths are intended to be used for different distance ranges, then the angular resolution can be different. This is shown in the table from FIG. 4. Other reasons for a difference in angular resolution, might include using the second wavelength for a faster overall scan, or to improved security, or for simple partial redundancy.

Figure 22:
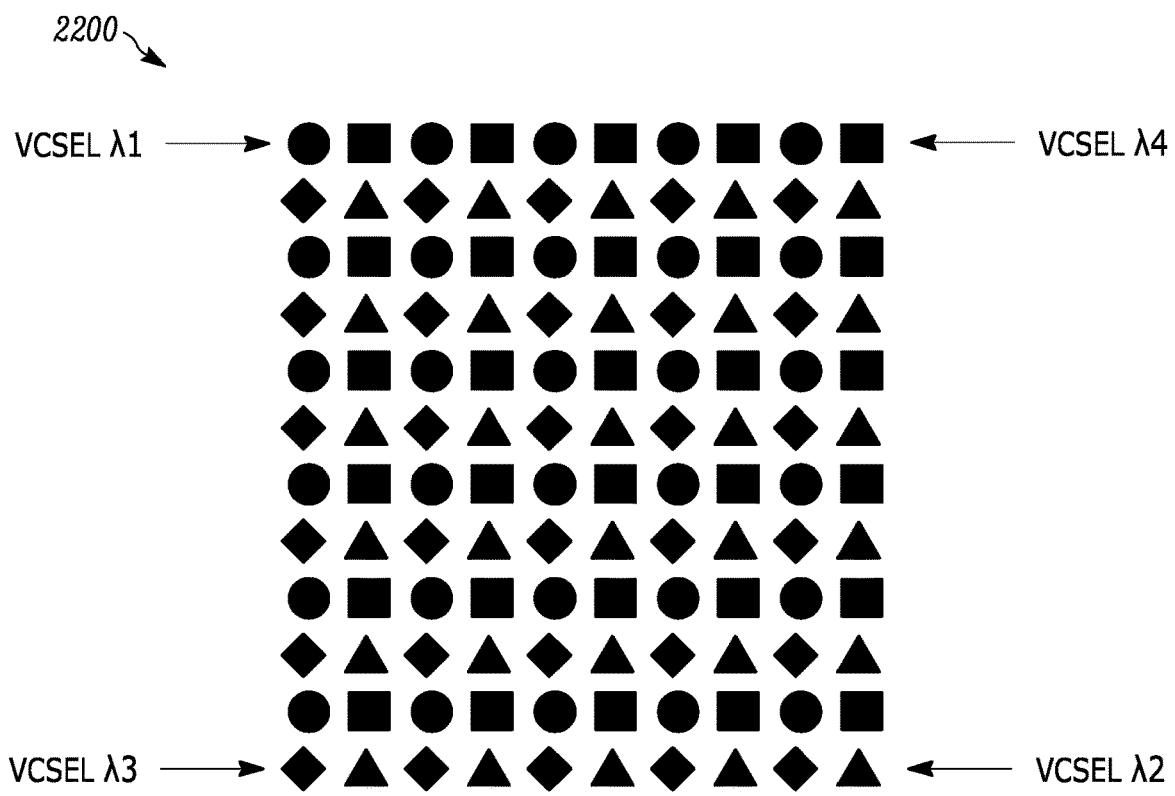
FIG. 22 illustrates an embodiment of a measurement point cloud of a multi-wavelength LIDAR utilizing four wavelengths of the present teaching.

One feature of LIDAR systems of the present teaching is that additional wavelengths can be easily added. With the use of additional wavelengths, and a more complex wavelength multiplexer, more measurement points can be added. FIG. 22 illustrates an embodiment of a measurement point cloud 2200 of the present teaching. The point cloud represents measurement points provided by four different wavelengths. The points associated with each wavelength are illustrated as different shapes in the 3D measurement point cloud.

One feature of the present teaching is that the optical system can be configured such that the generated 3D point cloud has different angular resolution along different directions. The optical configuration including the spacing of the elements in a VCSEL array together, the collimation, and the combining devices in the projection element are arranged to change the angular resolution in a given direction that maximizes the density where desired and minimizes the density where not required. In some embodiments, the VCSEL devices are laid out in a regular uniform pattern, where the density is substantially constant in the horizontal and vertical direction, but not necessarily required to be the same in each direction. Such a configuration can assist in the manufacturing process since it is desirable to have a relatively uniform layout to ease the assembly and electrical connection of the VCSEL devices to a package.

Figure 23A:
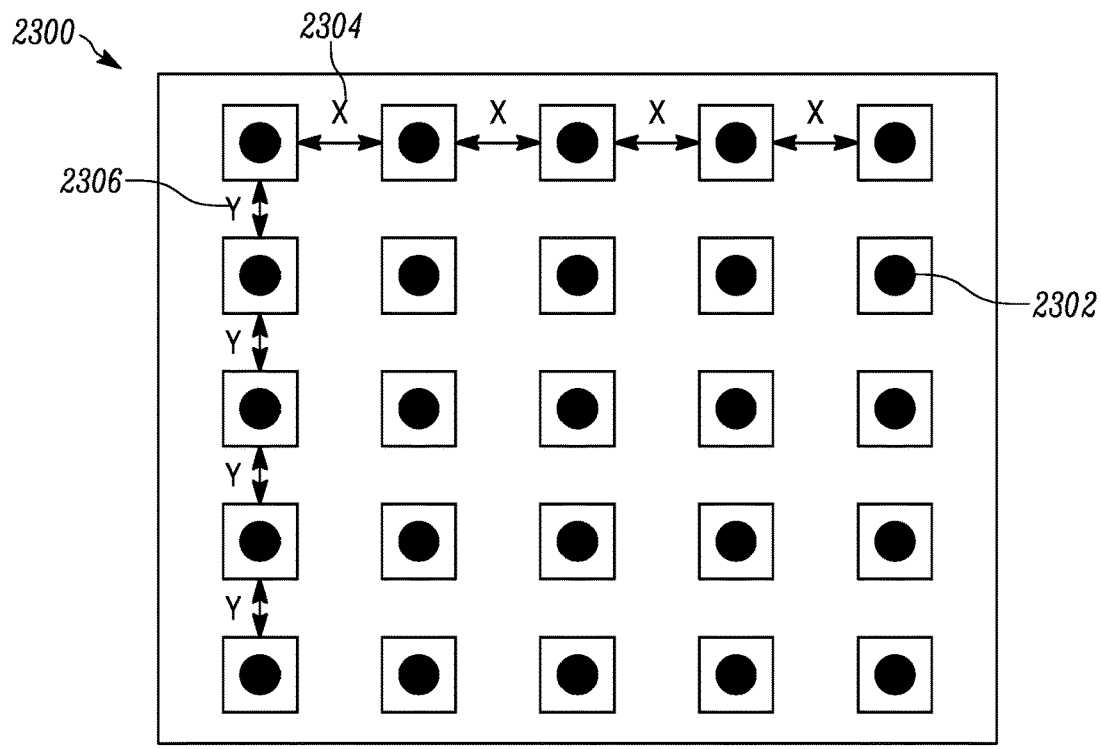
FIG. 23A illustrates a VCSEL array layout for an embodiment of a multi-wavelength LIDAR where the angular resolution changes in a particular direction according to the present teaching.

FIG. 23A illustrates a VCSEL array layout 2300 for an embodiment of a multi-wavelength LIDAR where the angular resolution changes in a particular direction according to the present teaching. The substrate comprises twenty-five VCSEL lasers 2302, laid out in a regular pattern where the spacing is constant in each direction, but different between the two directions. In the horizontal direction, each VCSEL device 2302 is offset with a uniform spacing of x 2304 between devices, and in the vertical with a uniform spacing of y 2306 between devices. Thus, the VCSEL laser array has a uniform spacing in the x-direction and a uniform spacing the y-direction, but the two spacings are not the same.

Figure 23B:
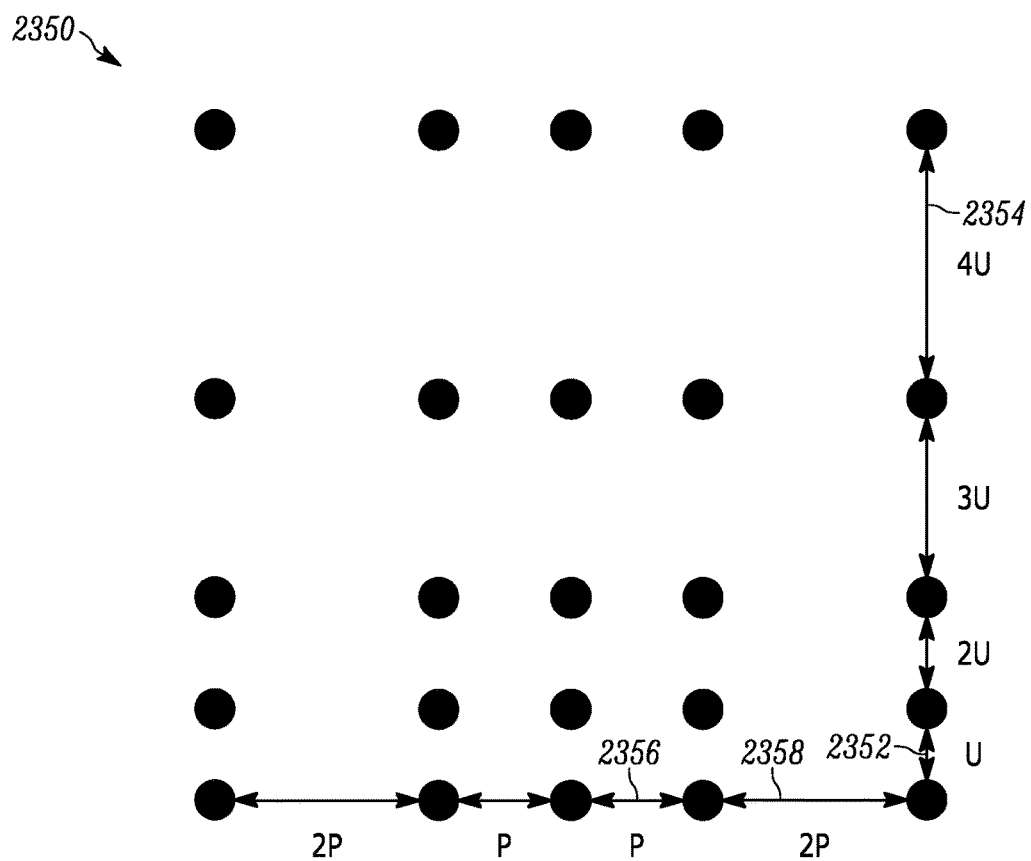
FIG. 23B illustrates a measurement point cloud generated by an embodiment of a multi-wavelength LIDAR with varying angular resolution according to the present teaching.

FIG. 23B illustrates a measurement point cloud 2350 generated by an embodiment of a multi-wavelength LIDAR with varying angular resolution according to the present teaching. A non-uniform 3D point cloud that can be created by the optical system from the uniform VCSEL structure of FIG. 23A. In the embodiment of FIG. 23B, the spacing of the projected measurement points varies both in the horizontal and in the vertical directions and is no longer uniform. In the vertical direction, the spacing for the bottom two rows of devices is u 2352, and with each row increases by an additional spacing u 2352, to become 4u 2354 at the top. In the horizontal direction, there is a symmetric pattern centered about the central axis, with spacing, p 2556, for the two adjacent columns and then increasing to a spacing, 2p 2358. One feature of this embodiment is to have a lower number of VCSEL overall, for a given field-of-view. Such a configuration has relatively low cost and is useful for applications where high angular accuracy is only needed in a portion of the desired FOV. One skilled in the art will appreciate that numerous other patterns can be generated by LIDAR systems according to the present teaching.

Some embodiments of the LIDAR systems of the present teaching have a modular design where the VCSEL lasers are placed in a separate assembly that is designed to be used with one or more different optical designs, with different FOV. In these embodiments, only a single VCSEL laser assembly needs to be manufactured to address the needs of multiple automobiles and/or applications. We can understand that different vehicles, with different target uses and costs, will have widely varying requirements for number of LIDAR systems, and the system range and FOV. Thus, one aspect of the LIDAR systems of the present teaching is constructing a modular LIDAR system. In these modular systems, the communication and data transfer to the modular VCSEL assembly may be digital, and all analog processing may occur within the modular unit.

It should be understood that varying angular resolution in different directions according to the present teaching as described in connection with FIGS. 23A and 23B is independent of number of wavelengths used. Even a single wavelength LIDAR system can benefit from varying the resolution in different directions.

The projection element of the illuminator can be constructed with various combinations of optical devices to achieve the desired beam profile and positions at a target plane. In the multi-wavelength LIDAR systems according to the present teaching, one optical device is used as a wavelength multiplexer to combine the different wavelengths. A wavelength multiplexer allows the beam paths, or beam directions to be modified as a function of wavelength. A variety of known wavelength multiplexer devices can be used. For example, thin film filters can be used to pass one wavelength, while reflecting other wavelengths. Also, diffractive optics can be used. If the lasers used are linearly polarized, then polarization sensitive optics can also be used. For two wavelengths LIDAR systems where each wavelength is linearly polarized (with one polarization orthogonal to the other), the wavelength multiplexer can be a polarizing beam splitter. For LIDAR systems with additional wavelengths, manipulating the polarization state using wave plates, and reflecting or passing light based on the polarization, can create a suitable wavelength multiplexer using a polarizing beam splitter.

Figure 24A:
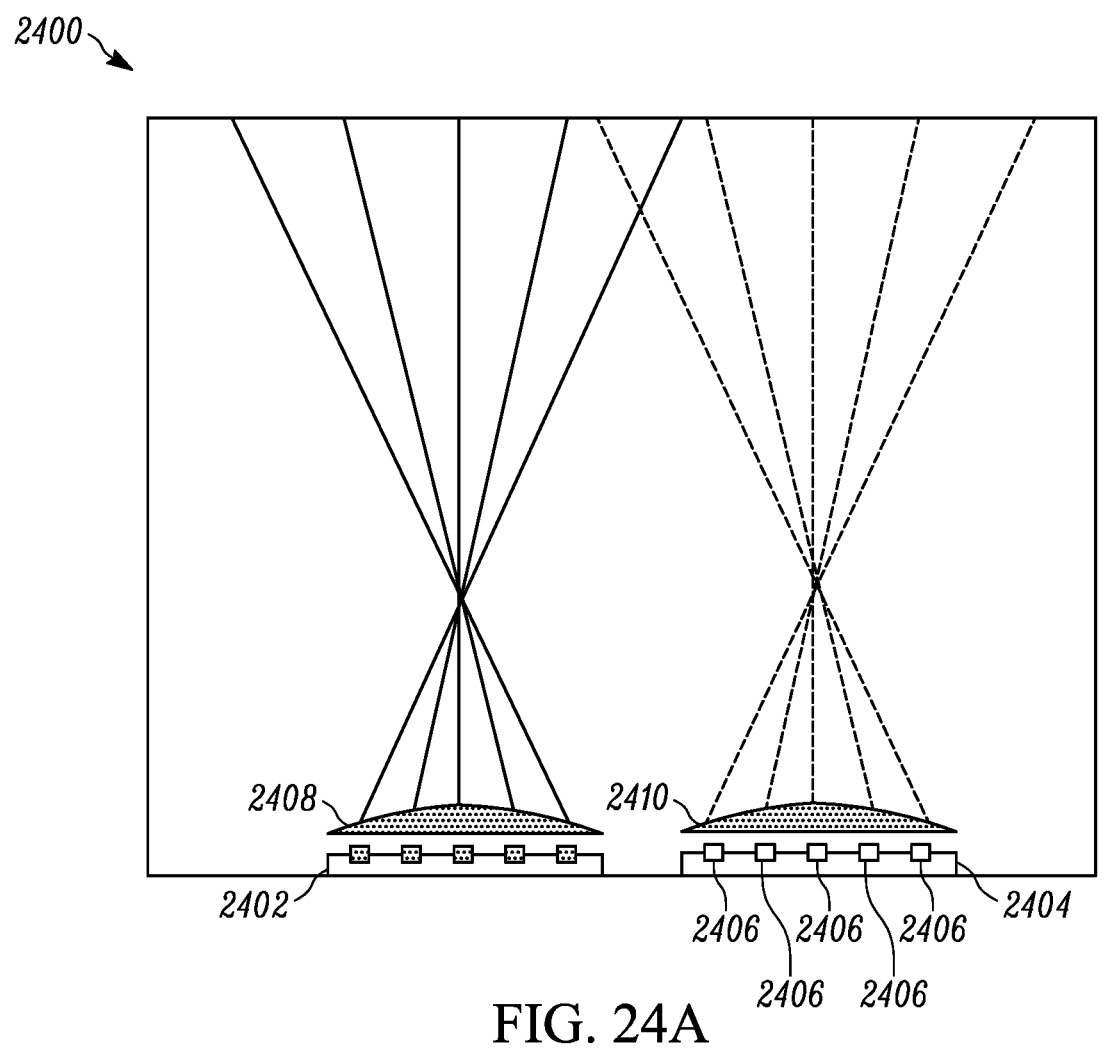
FIG. 24A illustrates an embodiment of a multi-mode multi-emitter VCSEL laser source of the present teaching.
Figure 24B:
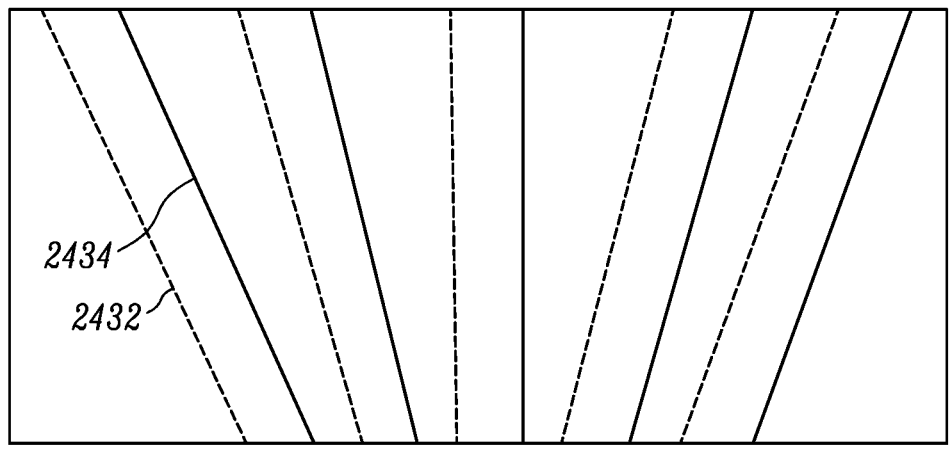
FIG. 24B illustrates a cross section of a projected beam profile of the multi-mode multi-emitter VCSEL laser source of FIG. 24A.
Figure 24C:
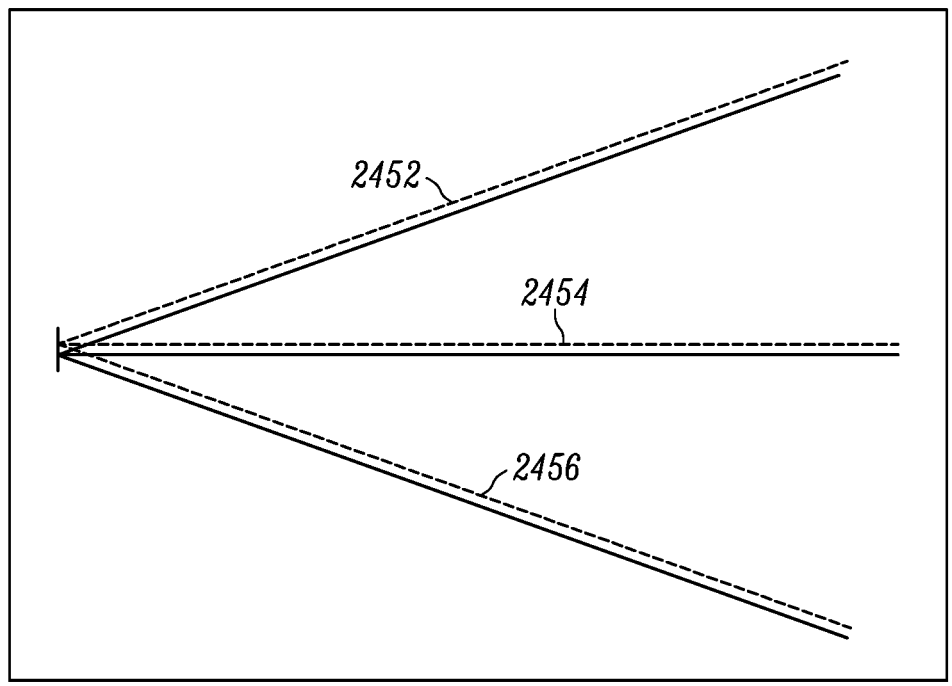
FIG. 24C illustrates the projection angles for the multi-mode multi-emitter VCSEL laser source of FIG. 24A.

In some particular embodiments, a region of space is sufficient to combine the beams. In the case of multi-mode VCSELs, the beam combination may be performed in free space without a common multiplexer. This region of free-space used to combine beams is referred to as a free-space optical element. FIGS. 24A-C illustrate such a free space combiner. FIG. 24A illustrates an embodiment of a multi-mode multi-emitter VCSEL laser source illuminator 2400 of the present teaching. Two VCSEL arrays 2402, 2404 with five laser emitters 2406 each are shown. The arrays 2402, 2404 are placed nominally in a single plane, although this is not required. The arrays can be offset or at an angle to each other. A separate lens system 2408, 2410 is used with each VCSEL array 2402, 2404 to set the projection angles. In practice, the arrays 2402, 2404 are separated by only about 10 mm.

In operation, the beams from the two arrays become fully interleaved as shown in FIG. 24B within a very short distance (<100 mm). FIG. 24B illustrates a cross section of a projected beam profile 2430 of the multi-mode multi-emitter VCSEL laser source of FIG. 24A. Light beams 2432, 2434 from the arrays 2402, 2404 are fully interleaved. With proper positioning of the lenses 2408, 2410, the angle of projection from each array can be adjusted to produce a uniform spacing. FIG. 24C illustrates the projection angles for the multi-mode multi-emitter VCSEL laser source of FIG. 24A. The beam projection angles 2450 shown include only the max 2452, median 2454, and minimum 2456 beam projection angles. The corresponding lasers from each array are spaced 10 mm apart, and the laser beams are shown projected out to a distance of 1 meter.

Thus, a region of free space may be used within the projection element to produce a desired profile of laser beams at the target planes in the field-of-view and range of the LIDAR system. It will be clear to those familiar with the art that the multi-emitter laser beams of different wavelengths projected using free space can be aligned in such a way to produce 3D measurement point cloud of adjacent points (for example as shown in FIG. 15B), or the measurement points could be made overlapping, partially or completely, as desired.

Another feature of the LIDAR systems of present teaching is the incorporation of a temperature monitor in close proximity to the VCSEL devices. Lasers are sensitive to temperature. The reliability of the laser devices can be improved by controlling the bias to the laser as a function of temperature. It is well known, for example, that the bias required for a certain fixed value of optical power will be lower at low temperatures. Some LIDAR systems according to the present teaching incorporate a temperature monitor in the transmitter to provide feedback for improved laser bias algorithms, laser lifetime reliability improvement, and overall system performance monitor.

Figure 25:
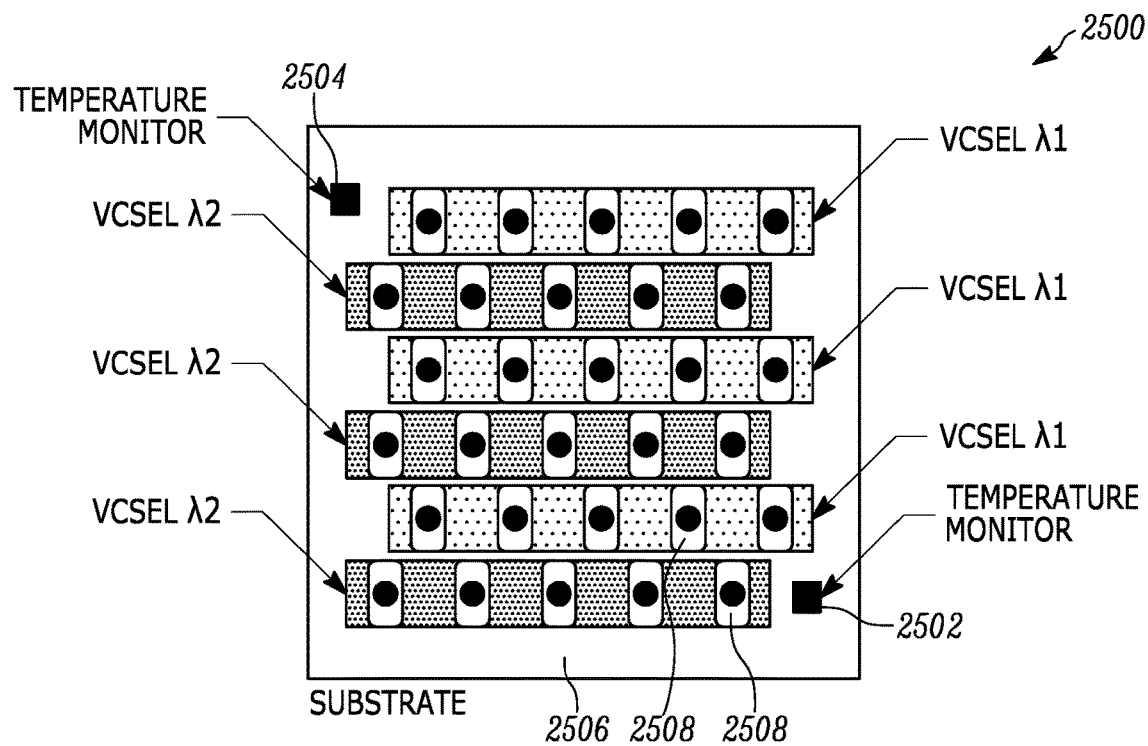
FIG. 25 illustrates an embodiment of a VCSEL array comprising a device used to measure temperature located in close proximity to the VCSEL devices according to the present teaching.

FIG. 25 illustrates an embodiment of a VCSEL array 2500 comprising a device used to measure temperature located in close proximity to the VCSEL devices according to the present teaching. Two temperature sensors 2502, 2504 are located on a single common substrate 2506. In various embodiments of the LIDAR system of the present teaching, one or more temperature sensors can be used. One temperature sensor may be adequate if the temperature gradient across the substrate 2506 is small, and or well predicted. For example, the temperature sensor can be a thermistor. Thermistors are well known in the art to have a resistance that is dependent on temperature. By passing a signal through the thermistor, and measuring the current/voltage, the operating resistance and thus temperature of the thermistor can be calculated.

It is desirable for some LIDAR systems according to the present teaching to incorporate and calibrate temperature monitors for various performance measures during manufacturing. By calibration, we mean the characterization of the laser bias, temperature, and output power of the device, and the subsequent tuning of laser bias and output power as a function of temperature to meet the required performance specifications with suitable margins. Often this process is performed during manufacturing. The performance parameters, such as the laser bias and optical power, obtained during the calibration process, can also be stored as a function of temperature as a reference in the system memory.

During operation of the LIDAR systems, the actual temperature can be monitored and used in conjunction with the values stored in memory as a look-up table to set the laser bias. Alternatively, in combination with an optical power monitor, the actual values of output power, laser bias, and temperature during operation can be compared to the reference values to identify any significant change or degradation in the system, which can indicate of potential reliability issues. In various implementations, a LIDAR system detecting such changes could then communicate to the overall monitoring system for the automotive vehicle that there is a need for potential service or repair.

The temperature sensor(s) 2502, 2504 can also be used to detect when the VCSEL laser devices 2508 are out of their intended operating range. Since automobiles are operated outside, potentially in extreme weather conditions, it could be important to the reliability and safety of the system to know with some accuracy the temperature of the VCSEL laser devices 2508. A system able to detect when temperature is outside of operation, could then take some action, such as preventing operation until ambient conditions meet operation criteria.

Figure 26:
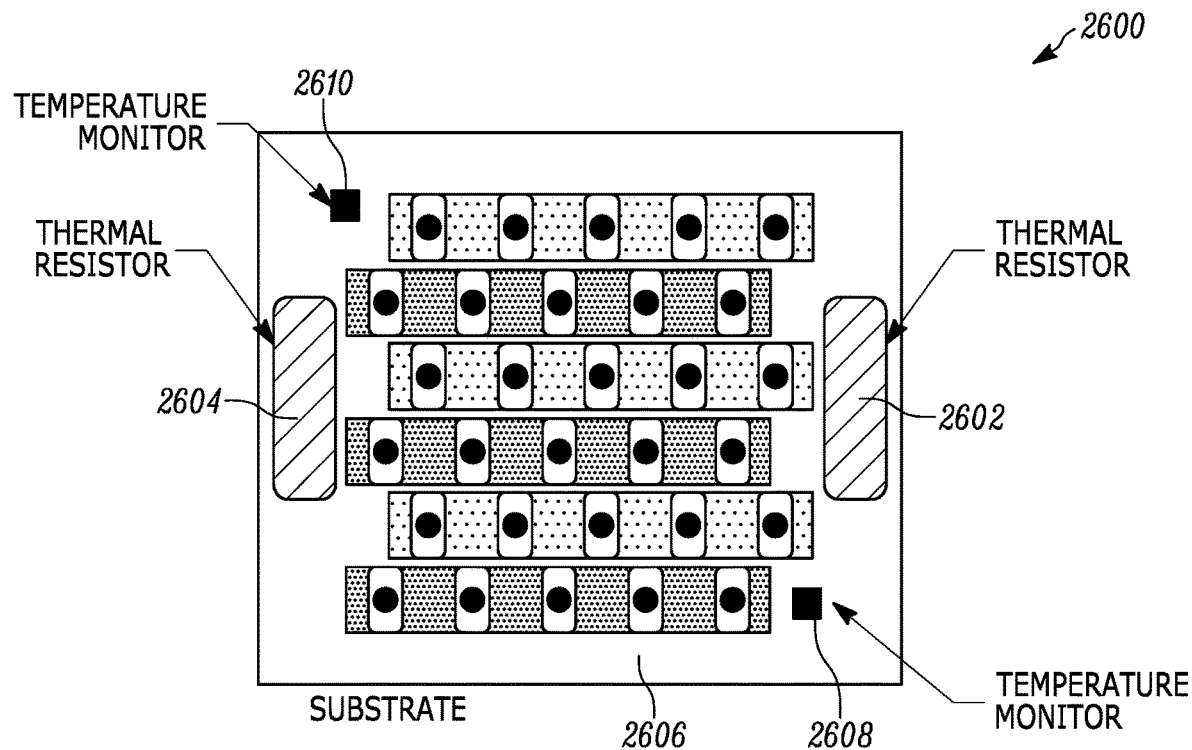
FIG. 26 illustrates an embodiment of a VCSEL array comprising an active thermal control device to control the VCSEL array temperature according to the present teaching.

FIG. 26 illustrates an embodiment of a VCSEL array 2600 comprising an active thermal control device 2602, 2604 used to control the VCSEL array 2600 temperature according to the present teaching. Active thermal control device 2602, 2604 are used to adjust the VCSEL temperature and bring it to within an operating range that is acceptable. Incorporation of active thermal control is sometimes desirable as it can be used to provide a wider range of operating temperature of the LIDAR system. The localized active thermal control device 2602, 2604 is co-located on the substrate(s) 2606 of the VCSEL array 2600 and constructed in such a fashion to attain the desired thermal efficiency. The thermal control device 2602, 2604 can be a heating resistor element. However, a system using only a heating resistor element, would be able to heat but not cool the VCSEL. Alternatively, a thermal electric cooler (TEC) could be used as the active thermal control device that can both heat as well as cool.

The VCSEL substrate 2606 includes several thermistors 2608, 2610 as well as thermal control devices 2602, 2604, which may be heating resistors. The thermistors 2608, 2610 are thermally coupled with the laser through the substrate and are in relatively close proximity to the lasers in order to monitor the temperature. The system will pass current as necessary through the heating resistors to bring the temperature measured by the thermistors into the desired temperature range.

Figure 27:
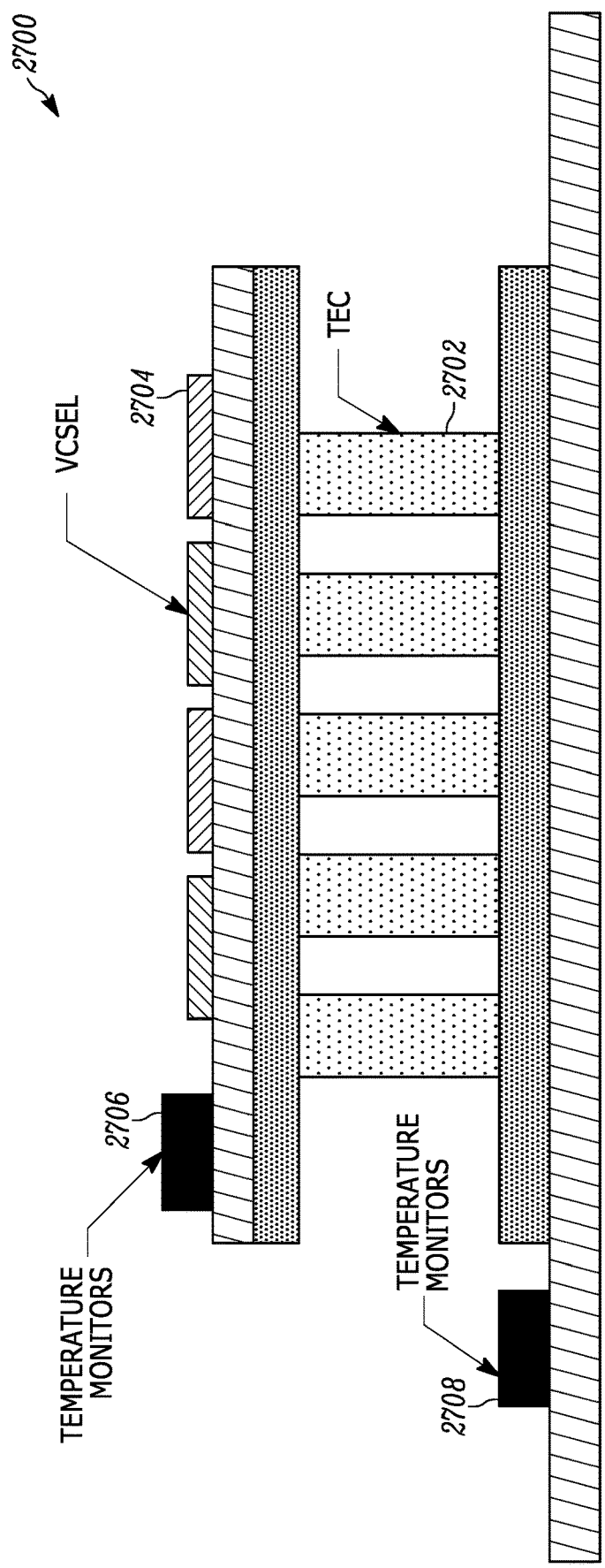
FIG. 27 illustrates an embodiment of a temperature-controlled VCSEL array comprising a thermo-electric cooler (TEC) for heating and cooling the VCSELs according to the present teaching.

FIG. 27 illustrates a cross section of temperature-controlled VCSEL array 2700 comprising a thermo-electric cooler (TEC) 2702 for heating and cooling the VCSELs 2704 according to the present teaching. In addition to having a thermistor 2706 in close proximity to the VCSELs 2704, a thermistor 2708 may also be placed at the base of the TEC 2702 in order to measure the base temperature.

Figure 28A:
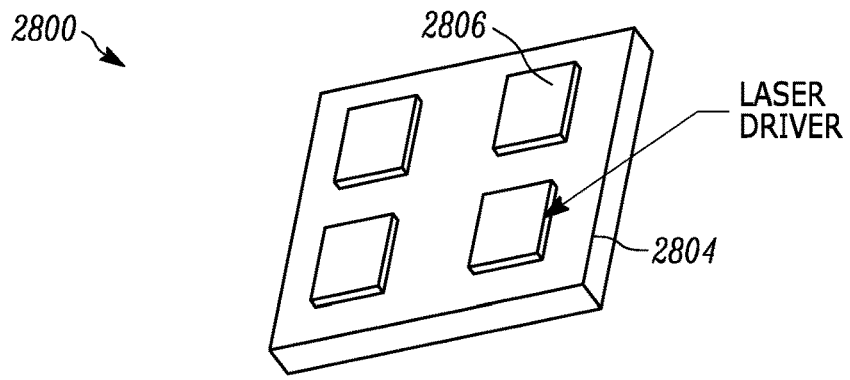
FIG. 28A illustrates a top-view of an embodiment of a compact VCSEL laser driver assembly of the present teaching.
Figure 28B:
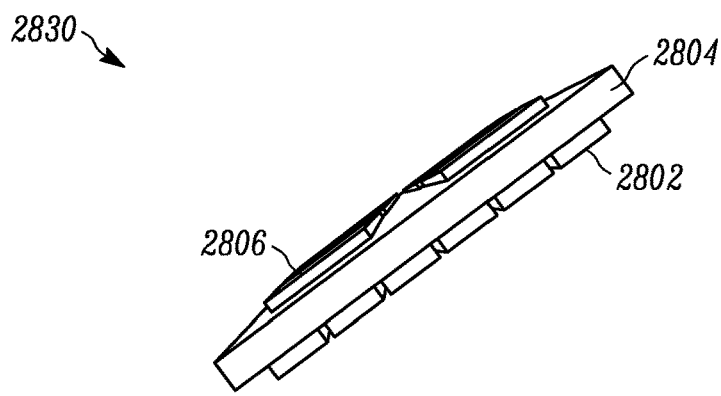
FIG. 28B illustrates a side-view of the embodiment of the compact VCSEL laser driver assembly of FIG. 28A.
Figure 28C:
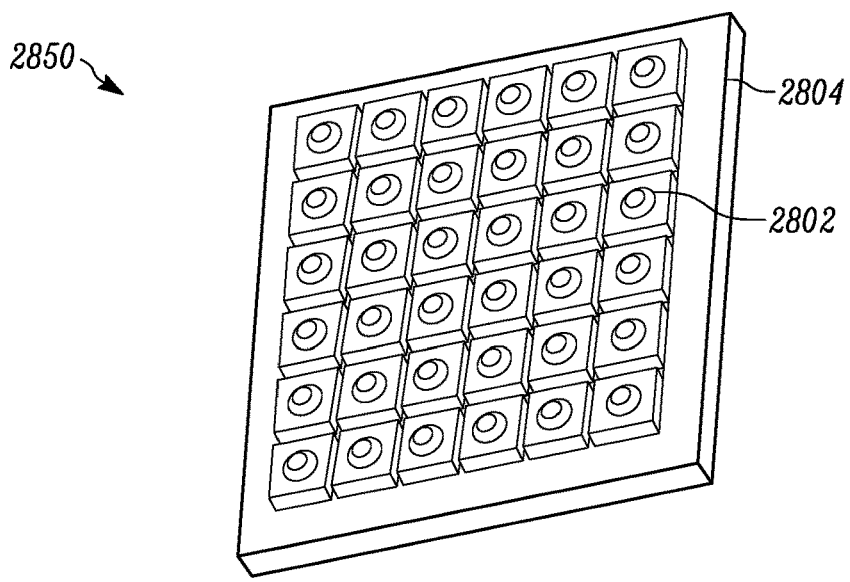
FIG. 28C illustrates a bottom-view of the embodiment of the compact VCSEL laser driver assembly of FIG. 28A.

Another feature of the LIDAR systems of the present teaching is the use of a highly integrated laser driver and VCSEL assembly where the laser driver and VCSEL lasers are placed on the same substrate, and optimized for desired RF performance. FIGS. 28A-C illustrate an embodiment of a compact VCSEL laser driver assembly for multi-wavelength LIDAR of the present teaching. FIG. 28A illustrates a top-view 2800 of an embodiment of a compact VCSEL laser driver assembly of the present teaching. FIG. 28B illustrates a side-view 2830 of the embodiment of the compact VCSEL laser driver assembly of FIG. 28A. FIG. 28C illustrates a bottom-view 2850 of the embodiment of the compact VCSEL laser driver assembly of FIG. 28A.

Referring to FIGS. 28A-28C, the array of VCSELs 2802 is placed on one side of a substrate 2804. The driver chips 2806 are placed on the opposite side. A multi-layer substrate 2804 can be used to route the laser driver signals from the drivers 2806 to the lasers in the array of VCSELs 2802. The multi-layer substrate 2804 could be a printed circuit board, a ceramic substrate, or on a flexible multi-layer circuit. One skilled in the art will appreciate that other substrate materials can also be used.

Figure 29:
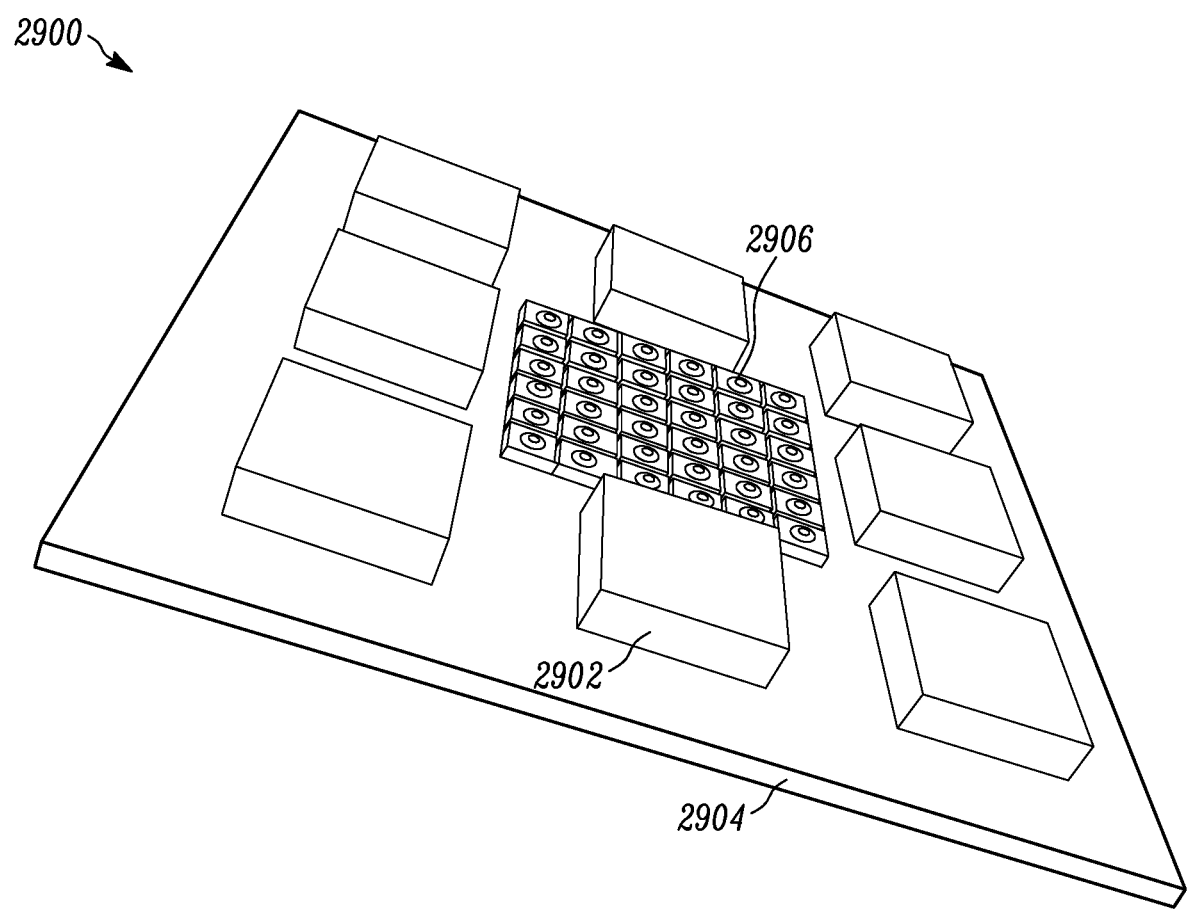
FIG. 29 illustrates another embodiment of a compact VCSEL laser driver assembly for multi-wavelength LIDAR of the present teaching.

FIG. 29 illustrates another embodiment of a compact VCSEL laser driver assembly 2900 for a multi-wavelength LIDAR system according to the present teaching. The laser drivers 2902 are located on the same substrate 2904 and on the same side as the VCSEL array 2906. An assembly 2900 with nine quad laser driver IC's is positioned on the substrate for thirty-six VCSEL lasers in the VCSEL array 2906.

Figure 30:
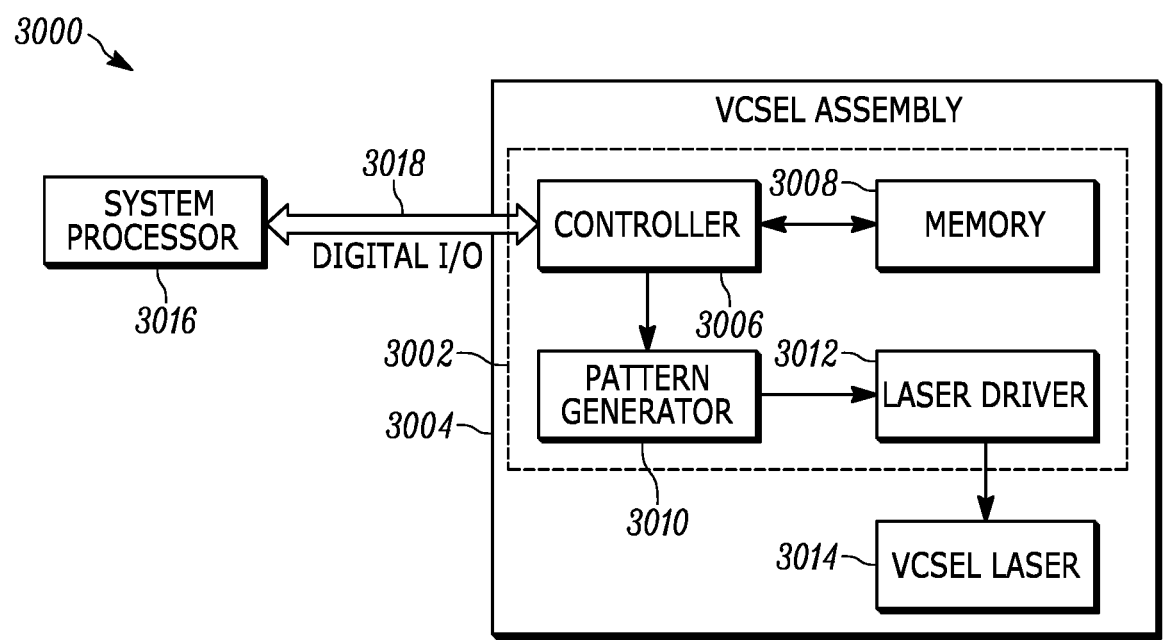
FIG. 30 illustrates a system block diagram of an embodiment of a compact VCSEL laser driver assembly for multi-wavelength LIDAR of the present teaching.

FIG. 30 illustrates a system block diagram of an embodiment of a compact VCSEL laser driver assembly 3000 for a multi-wavelength LIDAR of the present teaching. In this embodiment, the pulse generation chain 3002 is generated locally on the same carrier of the VCSEL assembly 3004. The pulse generation chain 3002 comprises a pulse controller 3006, memory 3008, pulse pattern generator 3010, and a laser driver 3012. The laser driver 3012 is connected to a VCSEL laser 3014, as shown. In some embodiments, the laser driver is connected to a common contact used to drive multiple VCSEL lasers. In some embodiments, pulse shapes might be stored in a local memory or generated by a combination of the controller and pattern generator.

The system processor 3016 is connected via a digital input/output connection 3018. The system processor 3016 generates a set of instructions that controls the laser instructing the laser to fire and for how long. These instructions will determine the pattern type. But, the pattern generation and biasing of the lasers is done locally on the VCSEL assembly. Generating the laser driver pulse patterns locally on the VCSEL assembly greatly simplifies the required interface to the overall LIDAR system. In some embodiments, the pulse controller 3006, memory 3008, pulse pattern generator 3010 and laser driver 3012 functions are all contained within a single IC package. In various embodiments, the VCSEL devices can be hermetically packaged or non-hermetically packaged.

Figure 31:
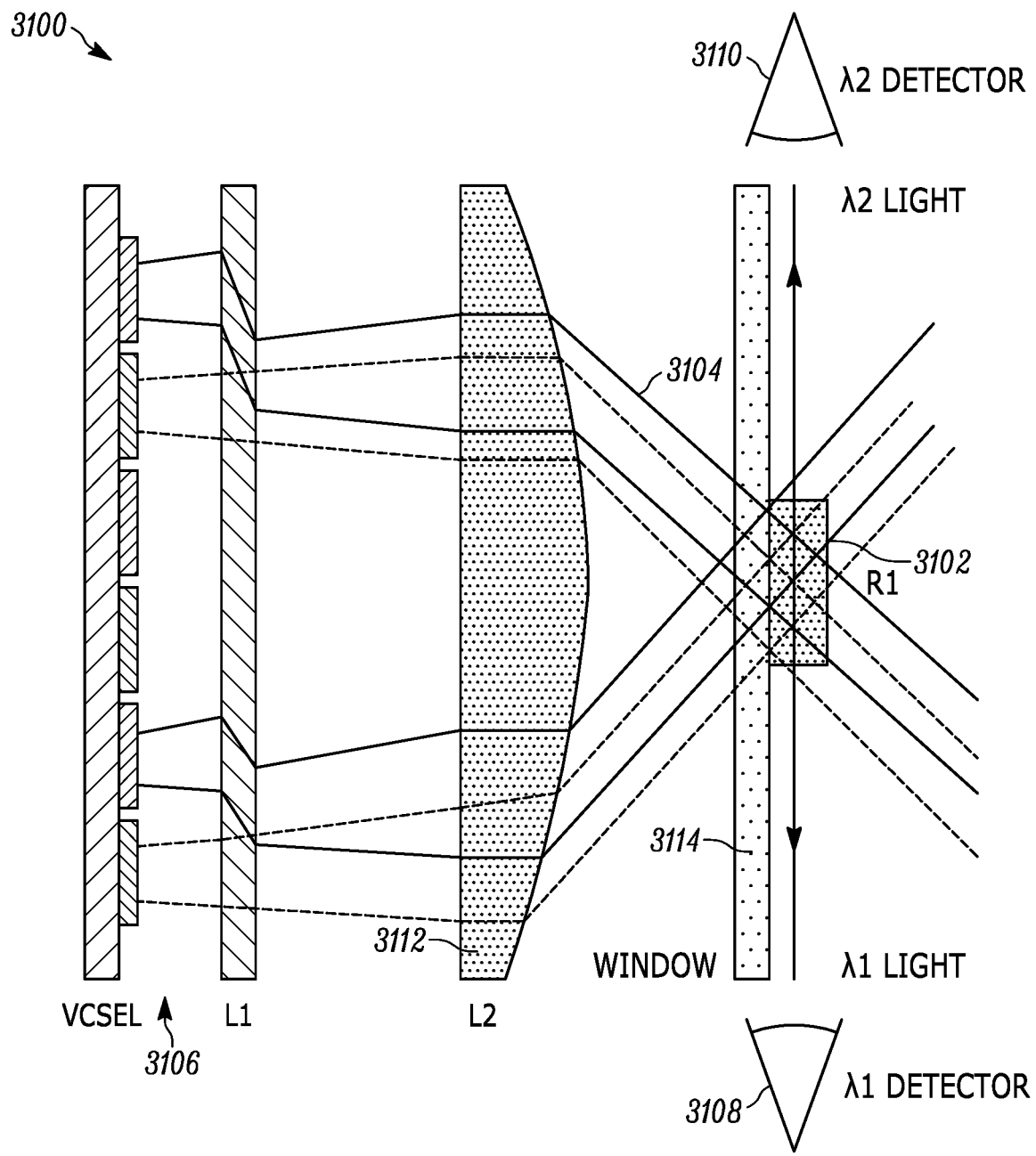
FIG. 31 illustrates an embodiment of a multi-wavelength optical power monitor for multi-element multi-wavelength LIDAR systems of the present teaching.

FIG. 31 illustrates an embodiment of a multi-wavelength optical power monitor for multi-element multi-wavelength LIDAR systems of the present teaching. This multi-element multi-wavelength LIDAR system utilizes the same illuminator projection element as in the multi-wavelength LIDAR system described in connection with FIG. 14, but with additional elements to enable optical power monitoring. A partial mirror 3102 reflects a portion of the optical beams 3104 at a point in the optical system where light beams from a plurality of lasers 3106 will be reflected. In some embodiments, the placement of the partial mirror 3102 is at a single point in the optical system. In other embodiments, reflected light is sampled at more than one point in the system using multiple reflective elements. The multiple reflection elements can be partial mirrors. The multiple reflection elements can also project the beam.

The reflected light is directed to a set of monitor photodetectors 3108, 3310, which are each sensitive to only one wavelength of light. The monitor photodetectors 3108, 3110 can simple be a notch filter positioned in front of individual broadband photodiodes. One aspect of the multi-wavelength LIDAR of the present teaching is the ability to have simultaneous and independent operation of lasers of different wavelengths. This allows monitoring optical power of the two wavelengths independently, which improves the system capabilities.

There is typically a location within the optical system at which the beams largely overlap. In the monitored LIDAR illuminator of FIG. 31, the overlap occurs after the optical device 3112. A reflecting element and a partial mirror 3102 mounted on a transparent window 3114 can be positioned in this overlap position. The window 3114 makes for a convenient mounting surface, and could be replaced by any mechanical structure that substantially passes the light. The reflecting element and the partial mirror 3102 reflects a portion of the light, which is typically less than 5% of the total optical power. The reflecting element and partial mirror 3102 can be mounted on either side of the window 3114. In addition, this reflecting element and partial mirror 3102 is shown reflecting the light of the different wavelengths in two directions. Separate detectors 3108, 3110 are used for detecting and monitoring the light from each wavelength used. It may also be the case that the reflecting element and partial mirror 3102 reflects the light from both wavelengths in one direction, while the light is still sampled separately using separate photodiodes and appropriate wavelength filtering.

The reflected light detected within the illuminator can also be used to provide additional control of the laser current bias. A laser diode has a range of operating bias currents. Lasers systems, including LIDAR systems, are often operated in closed loop fashion where the received photodiode current from the monitor diode serves as an input to a bias control loop. The LIDAR system will be able to react to changes in system stability, such as temperature or mechanical shifts, and to maintain an improved output power stability by monitoring and maintaining a constant value of the monitor photodiode current, which is a largely linear function of the incident power. Also, this monitoring and control of the laser bias can accommodate some amount of degradation of the laser over its lifetime without loss of optical power at system level.

Multi-wavelength power monitoring also improves the system robustness for detecting whether a fault is caused by laser degradation or shifts in optical performance. Multi-wavelength power monitoring provides redundancy if one set of wavelengths should fail. A partial or full failure in operation of one set of wavelengths would still allow the ability for partial operation of the system using the other set of wavelengths if the optical monitoring for each wavelength is independent.

Another aspect of the present teaching is a LIDAR system that performs optical monitoring. In some embodiments, the light received at each detector 3108, 3110 is monitored for parameters, such as laser wavelength, optical power, pulse timing, and pulse frequency. In these embodiments, the receiver is not simply a photodiode detector as depicted in FIG. 31, but also includes optics that allows detection of wavelength as well as optical power. In a LIDAR design where multiple wavelengths are used, particularly if the wavelengths are close in absolute value, it may be desired to monitor their absolute or relative values in order to ensure that the system parameters are as intended. Various methods of monitoring either absolute wavelength of the laser, or the relative offset between lasers of different wavelength are known in the art. Some of these methods use an etalon-based monitoring device.

Another feature of the multi-wavelength LIDAR systems of the present teaching is that wavelength differences of lasers positioned in an array can be used to improve collimation. In practice, a wafer of VCSEL devices is often manufactured such that the nominal wavelength is common across the full wafer, and the distribution of wavelengths within a small portion of the wafer, as covered by a single VCSEL cluster is very small, likely less than 1 nm. The nominal VCSEL wavelength may not be able to be shifted across the wafer in some cases, depending on the VCSEL design approach, and manufacturing method employed. However, there are some VCSEL manufacturing methods that allow different wavelengths to be targeted for different apertures. In such a VCSEL, we can make use of the wavelength shift along with a wavelength sensitive optic to provide better collimation than that achieved with non-wavelength sensitive optics.

Figure 32:
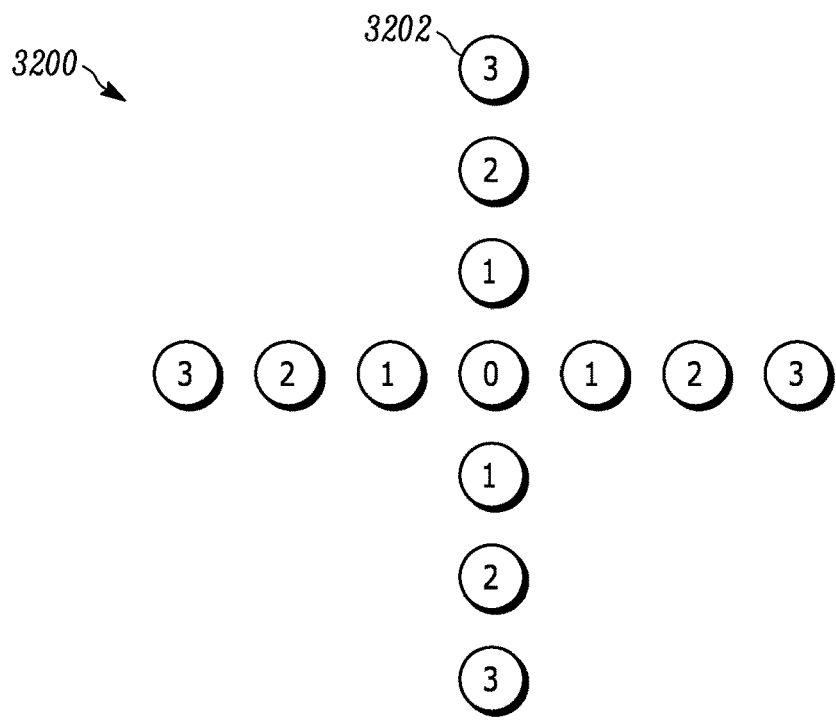
FIG. 32 illustrates an embodiment of a VCSEL cluster layout comprising laser apertures emitting different wavelengths according to the present teaching.

FIG. 32 illustrates an embodiment of a VCSEL cluster layout 3200 comprising laser apertures emitting different wavelengths according to the present teaching. The VCSEL cluster layout 3200 contains thirteen VCSEL apertures 3202. This VCSEL cluster layout 3200 is chosen for simplicity to better explain the method, whereas in actual practice a denser, more uniformly populated VCSEL cluster may be used. In this embodiment, the wavelength of individual VCSEL apertures 3202 within the cluster shifts based on radial position. And, the wavelength emitted by the VCSEL apertures 3202 along a particular radius is constant for all angles. In FIG. 32, each VCSEL aperture 3202 is labeled with a number indicating what position it is from the center VCSEL aperture.

Figure 33:
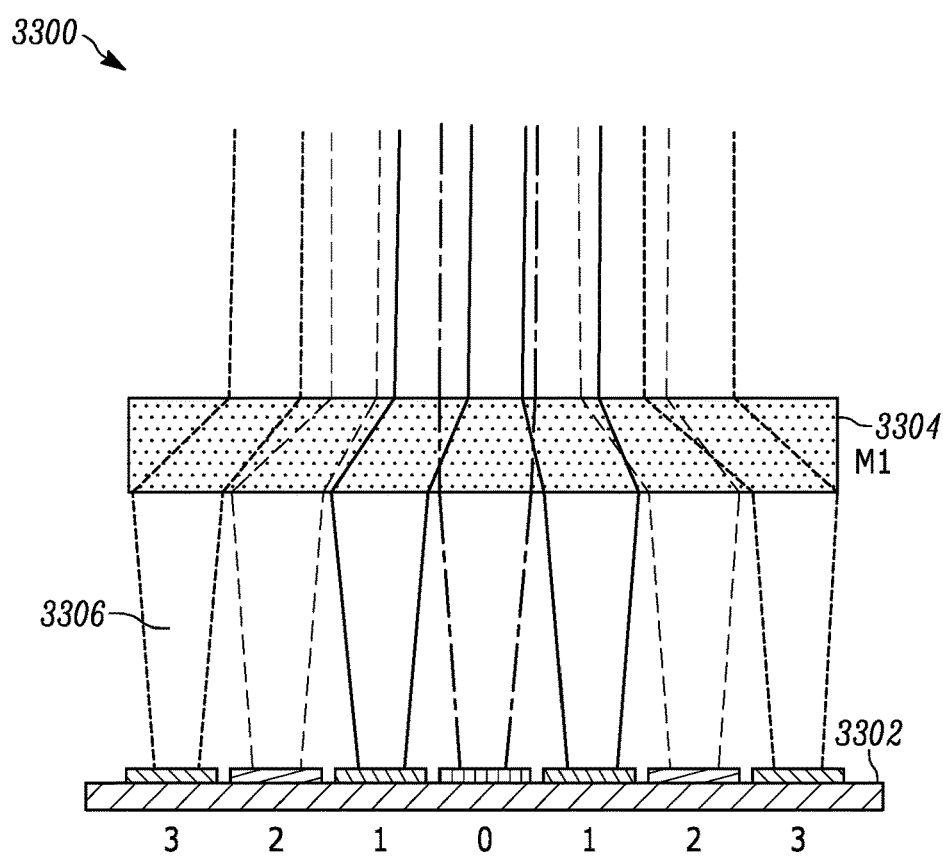
FIG. 33 illustrates an embodiment of an illuminator comprising the VCSEL cluster layout of FIG. 32.

FIG. 33 illustrates an embodiment of an illuminator comprising the VCSEL cluster layout of FIG. 32. The VCSEL cluster 3302 is positioned with a wavelength sensitive optical device 3304 according to the present teaching. The VCSEL cluster 3302 has wavelength varying radially, as described in connection with FIG. 32. In this case, the wavelength sensitive optical device 3304 acts to deflect the optical beams 3306 by an amount dependent on their wavelength. The paths of the optical beams 3306 projected by the optical device 3304 is a parallel set of paths. The deflection of the optical device 3304 thus results in a smaller diameter collimated beam then can be achieved if all of the apertures in the cluster were the same wavelength. In some embodiments, the wavelength sensitive optical device is a diffractive optic manufactured such that the magnitude of deflection of an input beam of light depends on its wavelength.

In some embodiments, the VCSEL structure is configured and the VCSEL is manufactured so that particular wavelengths within the cluster are desired wavelengths. In some embodiments, the wavelength within the VCSEL cluster is changed as a function of radial position using a VCSEL cluster that is configured to have a temperature gradient across the structure. A typical VCSEL laser is sensitive to temperature with a wavelength temperature coefficient of 0.1 nm/° C. A VCSEL cluster that had a structure with a thermal gradient that varies radially would also lead to shift of the VCSEL wavelength across the cluster, even if the devices all emit the same wavelength at a constant temperature.

EQUIVALENTS

While the Applicant's teaching are described in conjunction with various embodiments, it is not intended that the applicant's teaching be limited to such embodiments. On the contrary, the Applicant's teaching encompass various alternatives, modifications, and equivalents, as will be appreciated by those of skill in the art, which may be made therein without departing from the spirit and scope of the teaching.

What is claimed is:

1. A multi-wavelength LIDAR system comprising:
    a) a first laser source that generates a first optical beam having a first wavelength and a second laser source that generates a second optical beam having a second wavelength;
    b) a wavelength combiner positioned to receive the first and second optical beams, the wavelength combiner projecting the first optical beam in a first path to form a first beam profile at a target plane and projecting the second optical beam in a second path that is parallel to and spaced apart from the first path to form a second beam profile at the target plane such that an offset is caused between a center of the first beam profile and a center of the second beam profile in a dimension at the target plane;
    c) an optical receiver positioned to receive a portion of the first beam profile reflected at the target plane and a portion of the second beam profile reflected at the target plane, the optical receiver generating at a first output a first wavelength signal corresponding to the received reflected portion of the first beam profile and generating at a second output a second wavelength signal corresponding to the reflected portion of the second beam profile at the target plane; and
    d) a controller having a first input that is electrically connected to the first and second outputs of the optical receiver, the controller generating a measurement point cloud from the first and second wavelength signals generated by the optical receiver, wherein an angular resolution of the measurement point cloud in the dimension depends on the offset.

2. The multi-wavelength LIDAR system of claim 1 wherein at least one of the first and second laser sources comprises an integrated lenslet.

3. The multi-wavelength LIDAR system of claim 1 wherein at least one of the first and second laser sources comprises a pulsed laser source.

4. The multi-wavelength LIDAR system of claim 3 wherein the first and second laser sources are configured to generate a first pulsed optical beam with a first pulse width and a second pulsed optical beam with a second pulse width, respectively.

5. The multi-wavelength LIDAR system of claim 3 wherein the first and second laser sources are configured to generate a first higher-order optical beam with a first signature and a second higher-order optical beam with a second signature, respectively.

6. The multi-wavelength LIDAR system of claim 3 wherein the first and second laser sources are configured to generate a first pulsed optical beam with a first repetition rate and a second pulsed optical beam with a second repetition rate, respectively.

7. The multi-wavelength LIDAR system of claim 1 wherein at least one of the first and second laser sources are configured to generate polarized optical beams.

8. The multi-wavelength LIDAR system of claim 1 wherein the first and second beam profiles spatially overlap on the target plane, thereby increasing the angular resolution of the measurement point cloud.

9. The multi-wavelength LIDAR system of claim 1 wherein the angular resolution comprises a first and a second angular resolution.

10. The multi-wavelength LIDAR system of claim 1 wherein a field-of-view of the measurement point cloud comprises a first and a second field-of-view.

11. The multi-wavelength LIDAR system of claim 1 wherein the wavelength combiner comprises a free space optical element.

12. The multi-wavelength LIDAR system of claim 1 wherein the wavelength combiner comprises a wavelength multiplexer.

13. The multi-wavelength LIDAR system of claim 1 wherein the optical element wavelength combiner comprises a diffractive optical element.

14. The multi-wavelength LIDAR system of claim 1 further comprising a lens.

15. The multi-wavelength LIDAR system of claim 1 wherein the wavelength combiner is configured so that the angular resolution of the measurement point cloud is less than 0.4 degree at a predetermined distance from the target plane to the wavelength combiner.

16. The multi-wavelength LIDAR system of claim 1 further comprising a projection element.

17. The multi-wavelength LIDAR system of claim 1 wherein the optical receiver comprises a first receiver that detects light with the first wavelength and a second receiver that detects light with the second wavelength.

18. The multi-wavelength LIDAR system of claim 1 further comprising a performance monitor providing at least one of calibration, performance, and reliability monitoring.

19. The multi-wavelength LIDAR system of claim 18 wherein the performance monitor comprises an optical power monitor.

20. The multi-wavelength LIDAR system of claim 18 wherein the performance monitor comprises a wavelength monitor.

21. The multi-wavelength LIDAR system of claim 1 further comprising a temperature monitor.

22. The multi-wavelength LIDAR system of claim 21 further comprising a thermal control device.

23. The multi-wavelength LIDAR system of claim 1 wherein the first and second outputs of the receiver are the same output.

24. The multi-wavelength LIDAR system of claim 1 wherein the optical receiver generates the first wavelength signal corresponding to the received reflected portion of the first beam profile and generates the second wavelength signal corresponding to the reflected portion of the second beam profile at the target plane at a same time.

25. The multi-wavelength LIDAR system of claim 1 wherein the optical receiver generates the first wavelength signal corresponding to the received reflected portion of the first beam profile and generates the second wavelength signal corresponding to the reflected portion of the second beam profile at the target plane at different times.

* * * * *